US007936865B2

(12) United States Patent
Brunson et al.

(10) Patent No.: US 7,936,865 B2
(45) Date of Patent: May 3, 2011

(54) MESSAGING ADVISE IN PRESENCE-AWARE NETWORKS

(75) Inventors: Gordon R. Brunson, Broomfield, CO (US); Andrew Charles Zmolek, Highlands Ranch, CO (US)

(73) Assignee: Avaya Inc., Basking Ridge, NJ (US)

( * ) Notice: Subject to any disclaimer, the term of this patent is extended or adjusted under 35 U.S.C. 154(b) by 210 days.

(21) Appl. No.: 12/242,432

(22) Filed: Sep. 30, 2008

(65) Prior Publication Data

US 2009/0028303 A1    Jan. 29, 2009

Related U.S. Application Data

(62) Division of application No. 10/348,309, filed on Jan. 20, 2003, now Pat. No. 7,474,741.

(51) Int. Cl.
*H04M 3/42* (2006.01)
(52) U.S. Cl. .............. 379/215.01; 370/352; 370/353; 370/354; 370/355; 370/356; 379/88.11; 379/88.12; 379/88.13; 379/88.17; 379/88.18; 379/211.01; 379/212.01; 455/412.1; 455/412.2; 455/413; 455/414.1; 709/202; 709/203; 709/217; 709/225; 709/228
(58) Field of Classification Search .......... 370/259–271, 370/351–356; 379/88.08, 88.11, 88.12, 88.13, 379/88.14, 88.17, 88.18, 88.22, 211.01, 211.02, 379/212.01, 215.01; 455/412.1, 412.2, 413, 455/414.1; 709/202–203, 217, 224–226, 709/228–229
See application file for complete search history.

(56) References Cited

U.S. PATENT DOCUMENTS 4,817,130 A    3/1989    Frimmel, Jr.
(Continued)

FOREIGN PATENT DOCUMENTS

EP    0886416    12/1998
(Continued)

OTHER PUBLICATIONS

Official Action for U.S. Appl. No. 11/549,448, mailed Mar. 9, 2010.
(Continued)

*Primary Examiner* — Hemant Patel
(74) *Attorney, Agent, or Firm* — Sheridan Ross P.C.

(57) ABSTRACT

A presence aware communications system, comprising a messaging system configured to perform at least one of the following operations:
(a) provide a subscriber's communication device with information regarding an incoming contact during a messaging session between the subscriber's communication device and the messaging system;
(b) provide the subscriber's communication device with a text message containing information regarding one or more messages when a notification is received that the subscriber's communication device is available;
(c) provide the subscriber's communication device with a text message relating to a voice message from a different first party received by the messaging system;
(d) in response to the subscriber's communication device requesting a connection with at least one of an inputted telephone number and address, provide the subscriber's communication device with a notification respecting at least one eligible message from a second party associated with the at least one of an inputted telephone number and address;
(e) while a contact between the subscriber and a different third party is in progress, provide the subscriber's communication device with information respecting the at least one eligible message from the third party;

(f) transform an audio messaging session between the messaging system and the communication device of a contacting party into a graphical user interface-based audio session; and (g) transform the audio messaging session into a session having a video channel or both audio and video channels.

9 Claims, 14 Drawing Sheets

U.S. PATENT DOCUMENTS

| | | | |
|---|---|---|---|
| 4,941,168 A | 7/1990 | Kelly, Jr. | |
| 5,003,577 A | 3/1991 | Ertz et al. | |
| 5,185,782 A | 2/1993 | Srinivasan | |
| 5,206,903 A | 4/1993 | Kohler et al. | |
| 5,329,578 A | 7/1994 | Brennan et al. | |
| 5,341,414 A | 8/1994 | Popke | |
| 5,371,534 A | 12/1994 | Dagdeviren et al. | |
| 5,410,343 A | 4/1995 | Coddington et al. | |
| 5,430,792 A | 7/1995 | Jesurum et al. | |
| 5,434,908 A | 7/1995 | Klein | |
| 5,493,692 A | 2/1996 | Theimer et al. | |
| 5,511,112 A | 4/1996 | Szlam | |
| 5,555,376 A | 9/1996 | Theimer et al. | |
| 5,712,902 A | 1/1998 | Florence et al. | |
| 5,742,763 A | 4/1998 | Jones | |
| 5,802,510 A | 9/1998 | Jones | |
| 5,805,587 A * | 9/1998 | Norris et al. | 370/352 |
| 5,819,084 A | 10/1998 | Shapiro et al. | |
| 5,826,039 A | 10/1998 | Jones | |
| 5,828,747 A | 10/1998 | Fisher et al. | |
| 5,864,874 A | 1/1999 | Shapiro | |
| 5,894,504 A * | 4/1999 | Alfred et al. | 379/88.13 |
| 5,903,726 A | 5/1999 | Donovan et al. | |
| 5,905,793 A | 5/1999 | Flockhart et al. | |
| 5,982,873 A | 11/1999 | Flockhart et al. | |
| 5,999,179 A | 12/1999 | Tatchell et al. | |
| 6,018,655 A | 1/2000 | Bartle et al. | |
| 6,031,896 A | 2/2000 | Gardell et al. | |
| 6,038,296 A | 3/2000 | Brunson et al. | |
| 6,046,762 A | 4/2000 | Sonesh et al. | |
| 6,068,188 A | 5/2000 | Knowles | |
| 6,088,441 A | 7/2000 | Flockhart et al. | |
| 6,094,681 A | 7/2000 | Shaffer et al. | |
| 6,128,304 A | 10/2000 | Gardell et al. | |
| 6,130,937 A | 10/2000 | Fotta | |
| 6,144,644 A | 11/2000 | Bajzath et al. | |
| 6,154,738 A | 11/2000 | Call | |
| 6,163,607 A | 12/2000 | Bogart et al. | |
| 6,167,266 A | 12/2000 | Havinis et al. | |
| 6,169,795 B1 | 1/2001 | Dunn et al. | |
| 6,173,053 B1 | 1/2001 | Bogart et al. | |
| 6,185,603 B1 | 2/2001 | Henderson et al. | |
| 6,188,756 B1 | 2/2001 | Mashinsky | |
| 6,192,122 B1 | 2/2001 | Flockhart et al. | |
| 6,199,048 B1 | 3/2001 | Hudetz et al. | |
| 6,208,870 B1 | 3/2001 | Lorello et al. | |
| 6,215,784 B1 | 4/2001 | Petras et al. | |
| 6,226,360 B1 | 5/2001 | Goldberg et al. | |
| 6,272,319 B1 | 8/2001 | Narusawa | |
| 6,298,062 B1 | 10/2001 | Gardell et al. | |
| 6,301,609 B1 | 10/2001 | Aravamudan et al. | |
| 6,307,931 B1 | 10/2001 | Vaudreuil | |
| 6,310,947 B1 | 10/2001 | Polcyn | |
| 6,311,231 B1 | 10/2001 | Bateman et al. | |
| 6,317,593 B1 | 11/2001 | Vossler | |
| 6,330,243 B1 | 12/2001 | Strandberg | |
| 6,330,317 B1 | 12/2001 | Garfinkel | |
| 6,332,081 B1 | 12/2001 | Do | |
| 6,360,222 B1 | 3/2002 | Quinn | |
| 6,408,177 B1 | 6/2002 | Parikh et al. | |
| 6,411,682 B1 | 6/2002 | Fuller et al. | |
| 6,430,271 B1 | 8/2002 | DeJesus et al. | |
| 6,430,602 B1 | 8/2002 | Kay et al. | |
| 6,430,604 B1 | 8/2002 | Ogle et al. | |
| 6,449,260 B1 | 9/2002 | Sassin et al. | |
| 6,456,711 B1 | 9/2002 | Cheung et al. | |
| 6,463,299 B1 | 10/2002 | Macor | |
| 6,463,471 B1 | 10/2002 | Dreke et al. | |
| 6,477,373 B1 | 11/2002 | Rappaport et al. | |
| 6,477,374 B1 | 11/2002 | Shaffer et al. | |
| 6,480,484 B2 | 11/2002 | Morton | |
| 6,535,600 B1 | 3/2003 | Fisher et al. | |
| 6,546,097 B1 | 4/2003 | Peltz | |
| 6,549,612 B2 | 4/2003 | Gifford et al. | |
| 6,560,318 B1 | 5/2003 | Spielman et al. | |
| 6,561,805 B2 | 5/2003 | Kumar | |
| 6,614,783 B1 | 9/2003 | Sonesh et al. | |
| 6,636,587 B1 | 10/2003 | Nagai et al. | |
| 6,658,095 B1 | 12/2003 | Yoakum et al. | |
| 6,665,534 B1 | 12/2003 | Conklin et al. | |
| 6,668,167 B2 | 12/2003 | McDowell et al. | |
| 6,675,168 B2 | 1/2004 | Shapiro et al. | |
| 6,700,967 B2 | 3/2004 | Kleinoder et al. | |
| 6,707,890 B1 | 3/2004 | Gao et al. | |
| 6,738,462 B1 | 5/2004 | Brunson | |
| 6,741,586 B1 | 5/2004 | Schuster et al. | |
| 6,750,897 B1 | 6/2004 | Moshrefi et al. | |
| 6,751,459 B1 | 6/2004 | Lee et al. | |
| 6,788,773 B1 | 9/2004 | Fotta | |
| 6,789,120 B1 | 9/2004 | Lee et al. | |
| 6,807,423 B1 | 10/2004 | Armstrong et al. | |
| 6,839,735 B2 | 1/2005 | Wong et al. | |
| 6,865,384 B2 | 3/2005 | Sagi et al. | |
| 6,868,395 B1 | 3/2005 | Szlam et al. | |
| 6,871,062 B2 | 3/2005 | Trop et al. | |
| 6,879,677 B2 | 4/2005 | Trandal et al. | |
| 6,879,828 B2 | 4/2005 | Virtanen et al. | |
| 6,891,933 B2 | 5/2005 | Kumamoto | |
| 6,891,934 B1 | 5/2005 | Gao et al. | |
| 6,925,166 B1 | 8/2005 | Chan | |
| 6,968,052 B2 | 11/2005 | Wullert, II | |
| 6,968,179 B1 | 11/2005 | De Vries | |
| 6,988,126 B2 | 1/2006 | Wilcock et al. | |
| 6,999,731 B2 | 2/2006 | Cronin | |
| 7,020,480 B2 | 3/2006 | Coskun et al. | |
| 7,023,971 B1 * | 4/2006 | Huart et al. | 379/88.18 |
| 7,023,980 B2 | 4/2006 | Lenard | |
| 7,027,586 B2 | 4/2006 | Bushey et al. | |
| 7,039,040 B1 | 5/2006 | Burg | |
| 7,054,939 B2 | 5/2006 | Koch et al. | |
| 7,058,036 B1 | 6/2006 | Yu et al. | |
| 7,068,762 B2 | 6/2006 | Skladman et al. | |
| 7,080,321 B2 | 7/2006 | Aleksander et al. | |
| 7,092,370 B2 | 8/2006 | Jiang et al. | |
| 7,099,867 B2 | 8/2006 | Okada et al. | |
| 7,130,390 B2 | 10/2006 | Abburi | |
| 7,158,630 B2 | 1/2007 | Fotta et al. | |
| 7,192,235 B2 * | 3/2007 | Blight et al. | 455/412.1 |
| 7,215,760 B2 | 5/2007 | Lenard | |
| 7,246,371 B2 | 7/2007 | Diacakis et al. | |
| 7,248,677 B2 | 7/2007 | Randall et al. | |
| 7,269,247 B2 | 9/2007 | Mashinsky | |
| 7,283,805 B2 | 10/2007 | Agrawal | |
| 7,283,808 B2 | 10/2007 | Castell et al. | |
| 7,287,056 B2 | 10/2007 | Loveland et al. | |
| 7,299,259 B2 | 11/2007 | Petroyikh | |
| 7,356,137 B1 | 4/2008 | Burg et al. | |
| 7,398,061 B2 | 7/2008 | Mousseau | |
| 2001/0006893 A1 | 7/2001 | Yoshioka | |
| 2002/0019829 A1 | 2/2002 | Shapiro | |
| 2002/0021307 A1 | 2/2002 | Glenn et al. | |
| 2002/0032040 A1 | 3/2002 | Tsukamoto | |
| 2002/0035605 A1 | 3/2002 | McDowell et al. | |
| 2002/0052225 A1 | 5/2002 | Davis et al. | |
| 2002/0055350 A1 | 5/2002 | Gupte et al. | |
| 2002/0065894 A1 | 5/2002 | Dalai et al. | |
| 2002/0069081 A1 | 6/2002 | Ingram et al. | |
| 2002/0076010 A1 | 6/2002 | Sahel | |
| 2002/0076025 A1 | 6/2002 | Liversidge et al. | |
| 2002/0085701 A1 | 7/2002 | Parsons et al. | |
| 2002/0087630 A1 | 7/2002 | Wu | |
| 2002/0098831 A1 | 7/2002 | Castell et al. | |
| 2002/0112186 A1 | 8/2002 | Ford et al. | |
| 2002/0116336 A1 | 8/2002 | Diacakis et al. | |
| 2002/0116461 A1 | 8/2002 | Diacakis et al. | |
| 2002/0126701 A1 | 9/2002 | Requena | |
| 2002/0131395 A1 | 9/2002 | Wang | |
| 2002/0160757 A1 | 10/2002 | Shavit et al. | |
| 2002/0176558 A1 * | 11/2002 | Tate et al. | 379/215.01 |
| 2003/0014491 A1 | 1/2003 | Hovitz et al. | |
| 2003/0018720 A1 | 1/2003 | Chang et al. | |
| 2003/0028621 A1 | 2/2003 | Furlong et al. | |
| 2003/0041101 A1 | 2/2003 | Hansche et al. | |
| 2003/0073440 A1 | 4/2003 | Mukhegee et al. | |
| 2003/0086390 A1 | 5/2003 | Eschbach et al. | |
| 2003/0110228 A1 | 6/2003 | Xu et al. | |
| 2003/0130864 A1 | 7/2003 | Ho et al. | |

| | | | |
|---|---|---|---|
| 2003/0135569 | A1 | 7/2003 | Khakoo et al. |
| 2003/0154251 | A1 | 8/2003 | Manabe |
| 2003/0154293 | A1 | 8/2003 | Zmolek |
| 2003/0195811 | A1 | 10/2003 | Hayes et al. |
| 2003/0217142 | A1 | 11/2003 | Bobde et al. |
| 2003/0233415 | A1* | 12/2003 | Beyda .................... 709/206 |
| 2004/0010431 | A1 | 1/2004 | Thomas et al. |
| 2004/0062383 | A1 | 4/2004 | Sylvain |
| 2004/0120498 | A1 | 6/2004 | Sylvain |
| 2004/0133641 | A1 | 7/2004 | McKinnon et al. |
| 2004/0136505 | A1* | 7/2004 | Garg et al. ............ 379/88.12 |
| 2004/0141594 | A1 | 7/2004 | Brunson |
| 2004/0189698 | A1 | 9/2004 | Bokish |
| 2004/0198427 | A1 | 10/2004 | Kimbell et al. |
| 2005/0031107 | A1 | 2/2005 | Fotta |
| 2005/0187781 | A1 | 8/2005 | Christensen et al. |
| 2005/0216848 | A1 | 9/2005 | Thompson et al. |
| 2005/0276407 | A1 | 12/2005 | Mohler |
| 2007/0121808 | A1 | 5/2007 | Brunson et al. |
| 2007/0127699 | A1 | 6/2007 | Lenard |
| 2008/0089488 | A1 | 4/2008 | Brunson et al. |

FOREIGN PATENT DOCUMENTS

| | | |
|---|---|---|
| EP | 0930592 | 7/1999 |
| EP | 1259053 | 11/2002 |
| EP | 1261675 | 11/2002 |
| JP | 05-260188 | 10/1993 |
| JP | H8-23577 | 1/1996 |
| JP | 9-200813 | 7/1997 |
| JP | H11-046377 | 2/1999 |
| JP | 11-088495 | 3/1999 |
| JP | H11-187454 | 7/1999 |
| JP | H11-205837 | 7/1999 |
| JP | 2000-102059 | 4/2000 |
| JP | 2000-312258 | 11/2000 |
| JP | 2001-189774 | 7/2001 |
| JP | 2001-224075 | 8/2001 |
| JP | 2001-251395 | 9/2001 |
| JP | 2001-251682 | 9/2001 |
| JP | 2001-350782 | 12/2001 |
| JP | 2002-094614 | 3/2002 |
| JP | 2002-101155 | 4/2002 |
| JP | 2002-108794 | 4/2002 |
| JP | 2002-152335 | 5/2002 |
| JP | 2002-176449 | 6/2002 |
| JP | 2003-8655 | 1/2003 |
| JP | 2003-116175 | 4/2003 |
| JP | 2003-517781 | 5/2003 |
| JP | 2003-169147 | 6/2003 |
| JP | 2003-196469 | 7/2003 |
| JP | 2003-296556 | 10/2003 |
| JP | 2004-013303 | 1/2004 |
| JP | 2004-30371 | 1/2004 |
| WO | WO 97/24010 | 7/1997 |
| WO | WO 98/03923 | 1/1998 |
| WO | WO 98/12644 | 3/1998 |
| WO | WO 00/39964 | 7/2000 |
| WO | WO 00/69140 | 11/2000 |
| WO | WO 01/45368 | 6/2001 |
| WO | WO 01/55915 | 8/2001 |
| WO | WO 01/69387 | 9/2001 |
| WO | WO 01/71925 | 9/2001 |
| WO | WO 02/30105 | 4/2002 |
| WO | WO 02/093959 | 11/2002 |
| WO | WO 03/025776 | 3/2003 |
| WO | WO 03/054717 | 7/2003 |
| WO | WO 03/085539 | 10/2003 |
| WO | WO 03/096559 | 11/2003 |

OTHER PUBLICATIONS

Examiner's Refusal Decision (Including translation) for Japanese Patent Application No. 2007-002097, mailed Mar. 23, 2010.
Examiner's Office Letter (Including translation) for Japanese Patent Application No. 2007-2096, mailed Mar. 23, 2010.
Examiner's Refusal Decision (Including translation) for Japanese Patent Application No. 2007-2100, mailed Mar. 23, 2010.
Examiner's Report for Canadian Patent Application No. 2,455,256 dated Jan. 4, 2010.
Official Action for U.S. Appl. No. 11/549,448, mailed Jul. 12, 2010.
U.S. Appl. No. 10/865,114, filed Jun. 9, 2004, Craft.
U.S. Appl. No. 11/542,295, filed Oct. 3, 2006, Somani.
U.S. Appl. No. 11/626,217, filed Jan. 23, 2007, Coughlan.
U.S. Appl. No. 12/147,355, filed Jun. 26, 2008, Craft et al.
U.S. Appl. No. 12/242,103, filed Sep. 30, 2008, Zmolek.
U.S. Appl. No. 12/242,458, filed Sep. 30, 2008, Brunson et al.
U.S. Appl. No. 12/242,484, filed Sep. 30, 2008, Brunson et al.
U.S. Appl. No. 12/242,504, filed Sep. 30, 2008, Brunson et al.
U.S. Appl. No. 12/242,538, filed Sep. 30, 2008, Brunson et al.
U.S. Appl. No. 12/243,009, filed Sep. 30, 2008, Brunson et al.
Andy Zmolek; "Simple and Presence: Enterprise Value Propositions," Avaya presentation, 16 pages, presented Jan. 24, 2002.
Atkins et al "Common Presence and Instant Messaging: Message Format," Network Working Group (Jan. 9, 2003), available at http://www.ietf.internet-drafts/draft-ietf-impp-cpim-msgfmt-06.txt, 31 pages.
Berners-Lee et al.; "Uniform Resource Identifiers (URI); Generic Syntax," Network Working Group, Request for Comments 2396 (Aug. 1998), 38 pages.
Bill Michael, The Politics of Naming www.cConvergence.com (Jul. 2001) pp. 31-35.
CC News: Call Center Technology, "FaceTime gives voice, vision to instant messaging", available at http://www.ccnews.com/may2000/depts/cct/cctstory2.htm, 2 pages; Copyright 2000, 1999.
Chavez et al., "Interactive Applications of Personal Situation-Aware Assistants", Computers and Graphics, Pergamon Press Ltd., Oxford, GB, vol. 23, No. 6, Dec. 1999, pp. 903-915, XP 004187839, ISSN: 0097-8493.
CommWeb.com "Enterprise Customer Interfaces: Application Messaging Via Instant Messaging" (Dec. 9, 2002), available at http://www.commweb.com/article/COM20021209S0001/2, 3 pages.
CosmoCall Universe™, "The Carrier-Grade, All-IP Contact Center Platform for Next Generation Network-Based Services" (2002) 3 pages.
CosmoCall Universe™, "The Next Generation IP Contact Center Platform", available at http://www.cosmocom.com/ProductInfo/Product.htm, 18 pages, 1997-2003.
Crocker et al. "Common Presence and Instant Messaging (CPIM)," Network Working Group (Aug. 14, 2002), available at http://www.ietf.internet-drafts/draft-ietf-impp-cpim-03.txt, 33 pages.
Dawson et al.; "Vcard MIME Directory Profile," Network Working Group (Sep. 1998), available at http://www.ietf.org/rfc/rfc2426.txt?number=2426, 40 pages.
Day et al. "A Model for Presence and Instant Messaging," Network Working Group (Feb. 2000), available at http://www.ietf.org/rfc/rfc2277.txt?number=2778, 16 pages.
Day et al.; "Instant Messaging/Presence Protocol Requirements," Network Working Group (Feb. 2000), available at http://www.ietf.org/rfc/rfc2779.txt?number=2779, 25 pages.
e-Vantage Solutions, "Customer Service Window", available at http://www.evgl.com/dsw.html, 2 pages, 2003.
FaceTime Communications Press Release, "Amica Insurance Selects FaceTime Communications to Provide Instant Messaging-Based Customer Service in Enterprise" (Jun. 25, 2001), available at http://www.factime.com/pr/pr010625.shtm, 2 pages.
FaceTime Communications website, "Customer Services", available at http://www.facetime.com/custsvcs.shtm, 4 pages, 2003.
FaceTime Communications website, "Overview", available at http://www.facetime.com/solutions.shtm, 4 pages, 2003.
FaceTime Communications website, "Presence Management", available at http://www.facetime.com/presence.shtm, 3 pages, 2003.
Fielding et al.; "Hypertext Transfer Protocol—HTTP/1.1," Network Working Group, Request for Comments 2068 (Jan. 1997), 152 pages.
G. Klyne et al., "Instant Messaging using APEX", Network Working Group, Jun. 1, 2001, 19 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.

Grigonis, Computer Technology Encyclopedia (2000) pp. 342-345, 389-392.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
Holtman et al.; "HTTP Remote Variant Selection Algorithm—RVSA/1.0," Network Working Group (Mar. 1998), available at http://www.ietf.org/rfc/rfc2296.txt?number=2296, 13 pages.
Holtman et al.; "Transparent Content Negotiation in HTTP," Network Working Group (Mar. 1998), available at http://www.ietf.org/rfc/rfc2295.txt?number=2295, 55 pages.
J. Rosenberg et al., "SIP extensions for Instant Messaging", Internet Engineering Task Force, Jul. 18, 2001, 22 pages.
Live2Support, "Features", Available at http://web.archive.org/web/20040206215142/www.live2support.com/features_live_chat.php>, undated, 4 pages.
"MIT Project Oxygen Publications", 2 pages, undated.
MIT Project Oxygen, "Oxygen: Pervasive, Human-Centered Computing" MIT Laboratory for Computer Science, MIT Artificial Intelligence Laboratory (May 2002).
Ovisoft Technologies, "Ovisoft Messenger—Call Center Solutions", available at http://www.ofisoft.com/solutioncallcenter.htm, 1 page, 2003.
Richard Grigonis, Computer Telephony Encyclopedia (2000) pp. 367-375.
Richard Grigonis,. Computer Telephony Encyclopedia (2000) pp. 413-430.
Richard Shockey, 'ENUM: Phone Numbers Meet the Net' www.cConveroence.corn (Jul. 2001) pp. 21-30.
Rose et al.. "The APEX Presence Service," Network Working Group (Jan. 14, 2002), available at http://www.ieff.org/internet-drafs/draft-ielf-apex-presence-06.txt, 31 pages.
Schulzrinne, H., et al., "The Session Initiation Protocol: Internet-Centric Signaling", IEEE Communications Magazine (Oct. 2000), vol. 38, No. 10, pp. 134-141.
Stephanie Losi, "Instant Messaging for Call Centers Leaves 'Em Smiling" www.CRMDaily.com (Jun. 4, 2001), available at http://www.newsfactor.com/perl/story/10246.html, 3 pages.
Sugano et al, "Common Presence and Instant Messaging (CPIM) Presence Information Data Format," Network Working Group (Dec. 2002), available at http://www.lettorofintemet-drafts/draft-letf-impo-cnim-oidf-07.bct, 26 pages.
The MIT Oxygen Project, Cambridge, MA, Apr. 25-26, 2000.
Trudy Walsh, "Instant messaging boosts service at Texas call center" GCN (Nov. 2001), available at http://www.gcn.com/cgi-bin/udt/im.display.printable?client.id=state2&story.id=16765, 2 pages.
Venus Valley, "Live chat for your website", Available at http://www.pppindia.com/vvchat/shots.htm>, Venus Valley Live Support, 2003, 2 pages.
WiredRed News Release, "WiredRed to Provide Secure Instant Messaging for Eight New Call Center Customers", available at http://www.wiredred.com/news_release_callctr.html, 2 pages, Sep. 28, 2002.
XML-NS Tim Bray et al., "Namespaces in XML", W3C recommendation: xml-names, Jan. 14, 1999, 12 pages.

"Phone Mail Override for Incoming Calls", IBM Technical Disclosure Bullitin, vol. 37, No. 11, Nov. 1994.
Background of the Invention of the above-captioned application (previously provided).
Examiner's Report from Canadian Patent Application No. 2455256 dated Mar. 7, 2005.
Examiner's Report from Canadian Patent Application No. 2455256 dated Apr. 29, 2008.
Translated version of JP Office Action dated Jul. 5, 2006, for corresponding JP Application No. 2004-012113.
Communication transmitting Partial European Search Report for European Application No. EP 04250283, dated Jun. 8, 2004.
Communication transmitting European Search Report for European Patent Application 04250283.1 dated Jan. 3, 2005.
Examiner's Examination Report dated Aug. 31, 2005 for application 04-250-283.1.
Examiner's Search Report dated Jul. 11, 2006 for application 04-250-283.1.
Examination Report for European Patent Application No. 04250283.1, mailed Jun. 27, 2007.
European Search Report for European Application No. 06075649.1, mailed Mar. 28, 2007.
European Search Report for European Application No. 06075650.9, mailed May 10, 2007.
Examination Report for European Application No. 06075650.9, mailed Dec. 20, 2007.
European Search Report for European Application No. 06075662.4, mailed May 15, 2007.
Examination Report for European Application No. 06075662.4, mailed Dec. 27, 2007.
Official Action for U.S. Appl. No. 10/348,309, mailed Nov. 2, 2006.
Official Action for U.S. Appl. No. 10/348,309, mailed Apr. 20, 2007.
Official Action for U.S. Appl. No. 10/348,309, mailed Jan. 24, 2008.
Notice of Allowance for U.S. Appl. No. 10/348,309, mailed Aug. 22, 2008.
Okuyama et al., "Instant Message Technique for Supporting New Mobile Service", Fuzitsu, Fuzitsu Inc., Jul. 13, 2001, vol. 52, the fourth No., pp. 262-267 (translated abstract).
Restriction Requirement for U.S. Appl. No. 11/549,448, mailed Nov. 10, 2009.
Examiner's Office Letter for Japanese Patent Application No. 2007-002096, mailed Aug. 26, 2009.
Examiner's Office Letter for Japanese Patent Application No. 2007-002097, mailed Aug. 26, 2009.
Examiner's Office Letter for Japanese Patent Application No. 2007-002100, mailed Aug. 26, 2009.
Official Action for European Application No. 06075649.1, mailed Nov. 2, 2009.
Restriction Requirement for U.S. Appl. No. 11/953,591, mailed Sep. 20, 2010.
Official Action for U.S. Appl. No. 11/953,591, mailed Nov. 8, 2010.
Official Action for U.S. Appl. No. 12/242,458, mailed Nov. 23, 2010.
Official Action (including translation) for Japanese Patent Application No. 2007-002096, mailed Sep. 6, 2010.
Official Action for U.S. Appl. No. 12/242,484, mailed Jan. 13, 2011.

* cited by examiner

MESSAGING ADVISE IN PRESENCE-AWARE NETWORKS

CROSS REFERENCE TO RELATED APPLICATION

This application is a divisional of U.S. application Ser. No. 10/348,309, filed Jan. 20, 2003, now U.S. Pat. No. 7,474,741 entitled "MESSAGE ADVISE IN PRESENCE-AWARE NETWORKS", the disclosure of which is incorporated herein by reference in its entirety.

FIELD OF THE INVENTION

The present invention is directed generally to telephony networks and specifically to presence-aware telephony networks.

BACKGROUND OF THE INVENTION

The convergence of the mobile telephone network, the static telephone network, and the IP network provides a myriad of communication options for users. If one seeks to contact another individual, he or she may do so by electronic mail or e-mail, instant messaging, wired or wireless telephone, personal computer, pager, personal digital assistant or PDA, and Unified Messaging or UM systems, to name but a few. With so many options, it is difficult, if not impossible, to determine which option at a given point in time will provide the caller with the highest likelihood of contacting the desired individual or callee. Trial and error and guesswork are the typical techniques used to contact the callee, which more often than not leads to a waste of time and frustration on the part of the caller.

Various attempts have been made to provide a presence aware network, which would temporally track an individual's usage of selected communication devices to provide a contactor with the highest likelihood of contacting the individual. Most recently, the Session Initiation Protocol or SIP (which is a simple signaling/application layer protocol for data network multimedia conferencing and telephony) has been developed to provide a degree of presence awareness in a communication network. Although other protocols are equally supportive of presence concepts, SIP provider an illustrative basis for the present invention.

In SIP, end systems and proxy servers can provide services such as call forwarding, callee and caller number delivery (where numbers can be any naming scheme such as a conventional URL format), personal mobility (the ability to reach a callee under a single, location-independent address even when the callee changes terminals), terminal-type negotiation and selection (e.g., a caller can be given a choice on how to reach the callee), mobile phone answering service, terminal capability negotiation, caller and callee authentication, blind and supervised call transfer, and invitations to multicast conferences.

To provide these varied services, SIP uses a relatively simple message system, namely an "INVITE" message (with the caller's codec preferences) and an "OK" message (with the callee's codec preferences), and various software entities, namely registrars which maintain a map of the addresses of a given user at the current time, proxies which perform call routing, session management, user authentication, redirect functions, and routing to media gateways, redirect servers which perform a subset of forwarding functions, and SIP location servers which maintain user profiles and provide subscriber registration. "Registration" is a mechanism whereby a user's communication device registers with the network each time he or she comes online and individual profiles are accessed that specify information for routing based on a number of different criteria.

Although SIP provides some degree of presence awareness, more presence awareness is desirable. A fundamental problem of existing implementations is a notification gap in human communication between live-call and messaging systems. Existing implementations integrate live-call scenarios on an extremely limited scope. They are generally characterized by static rules for terminating a call at the messaging system or by allowing the messaging system to launch a call. For example, to determine the message waiting status of a mailbox you must either log into the mailbox, or the mailbox must turn on a device-specific message-waiting lamp or other static indicator. Both of these mechanisms exemplify direct, deliberate action on the part of either the user or the system, which is typical of current systems. Current commercial messaging systems allow only primitive dynamic correlation of message notification, presence and current call context. Even the most advanced workflow engines and collaborative environments in data networks that use more dynamic presence data with mailbox status notification suffer from severe limitations in their scope of communications. They generally cannot interoperate with the public switched telephone network.

SUMMARY OF THE INVENTION

These and other needs are addressed by the various embodiments and configurations of the present invention. The present invention is directed generally to methodologies and systems for using presence information to provide enhanced services to users of presence-aware communication networks, including subscribers of enhanced services and nonsubscribers.

In a first embodiment of the present invention, a method is provided for handling a contact (e.g., call) directed to a subscriber who is currently engaged in a messaging activity. The method includes the steps of:

(a) conducting a messaging session with a subscriber's communication device in which previously received messages (e.g., voice mail messages, electronic messages such as e-mail, instant messages, faxes, broadcast messages, notices, alerts, calendar items and directory information) are provided to the subscriber's communication device;

(b) during the messaging session, receiving a new contact intended for the subscriber's communication device;

(c) notifying the subscriber of the new contact attempt;

(d) when the subscriber accepts the contact, temporarily suspending the messaging session preferably preserving the state of the session and disabling timeout disconnect treatment for the duration of the contact; and (e) connecting the contactor with the subscriber's on the current call.

A "subscriber" refers to a person who is serviced by, registered or subscribed with, or otherwise affiliated with a messaging system. "Presence information" means any information associated with a network node and/or endpoint device, such as a communication device, that is in turn associated with a person or identity. Examples of presence information include registration information, information regarding the accessibility of the endpoint device, the endpoint's telephone number or address, the recency of use of the endpoint device by the person, recency of authentication by the person to a network component, the geographic location of the endpoint device, the type of media, format language, session and communications capabilities of the currently available communications devices, the preferences of the person (e.g., contact mode preferences or profiles such as the communication device to be contacted for specific types of contacts or under specified factual scenarios, contact time preferences, impermissible contact types and/or subjects such as subjects about which the person does not wish to be contacted, and permissible contact type and/or subjects such as subjects about which the person does wish to be contacted. Presence information can be user configurable, i.e., the user can configure the number and type of communications and message devices with which they can be accessed and to define different profiles that define the communications and messaging options presented to incoming contactors in specified factual situations. By identifying predefined facts, the system can retrieve and follow the appropriate profile. "Contact" means a connection or request for connection between two or more communication devices. The contact can be, for example, a telephone call, a chat session, a VoIP session, a conference call, instant message session, and multi-media session. Communication devices can be any type of communicating device, whether configured for circuit-switched or packet-switched networks, including, for example, IP hardphones such as the Avaya, Inc. 6400™, 2420™, and 4600™ series phones, Personal Digital Assistants or PDAs, Personal Computers or PCs, laptops, pagers, facsimile machines, modems, wired and wireless telephones, headsets, computing tablets, wearable communication devices, or any device capable of hosting software applications providing communications services such as e-mail clients, browsers, softphones, instant messaging, chat, audio conferring, etc. or devices which offer a combination of any such services.

In the second embodiment, a method for updating a subscriber regarding the receipt of one or more new messages is provided. The method includes the steps of:

(a) receiving a first notification relating to the availability of a communication device associated with a subscriber;

(b) determining a content type for a second notification containing message-related information, based on one or more capabilities of the communication device as reported by the presence server; and (c) when the communication device is configured to receive such content, transmitting the second notification to the communication device. "Availability" refers to the accessibility of at least one communication device associated with an identity through selected communication media. For example, an identity can be deemed to be available when an associated communication device firsts registers its address; when the subscriber used the communication device recently (i.e., within a predetermined time period); when the capabilities of the device dynamically change to allow it to, for example, receive "text" or when any device on the network is authenticated for the subscriber. The message-related information can be any type of information relating to one or more selected messages. Examples include the number of waiting, unreviewed, stored, unplayed, or unviewed messages, the identity of a selected message originator, the time of receipt of a selected message, and all or some of the contents of the selected message.

The second embodiment further provides another method for updating a subscriber regarding the receipt of one or more new messages. The method includes the steps of:

(a) receiving a new message for a subscriber;

(b) determining whether a communication device associated with the subscriber is available; and (c) when a communication device associated with the subscriber is available, transmitting a notification to the subscriber. The notification typically contains information associated with the new message. Whether or not the subscriber is notified of the new message(s) or the frequency of notification can be controlled by subscriber-configurable rules and/or preferences. The form of the notification can be tailored to the media capabilities of the subscriber's communication device.

In a third embodiment, a method for providing a subscriber with information regarding one or more eligible messages related to a new communication contact is provided. The method includes the steps of:

(a) receiving, from a subscriber, an address or telephone number associated with a communication device of a party to be contacted;

(b) providing the received address or telephone number to a messaging system;

(c) receiving a response from the messaging system;

(d) when the response indicates that one or more eligible message exists from the party to be contacted, notifying the subscriber of the eligible message(s) before the contact is made with the communication device of the party to be contacted; and (e) when the response indicates that no eligible message exists from the contacted party's communication device, permitting the contact to be made with the contacted party's communication device. If the subscriber requests the eligible messages, a message retrieval session is initiated between the subscriber's communication device and the messaging system.

The criteria used by the messaging system to identify eligible message(s) depends on the application and/or subscriber preferences. For example, the criteria can be the recency of receipt of the message, whether or not the message has been reviewed by the subscriber, whether or not the message has been played by the subscriber, whether or not the message has been viewed by the subscriber, whether or not a response or action has already occurred for the message, and the like.

In a fourth embodiment, another method for providing a subscriber with information regarding one or more messages relating to a contact already established is provided. The method includes the steps of:

(a) while a contact between a subscriber and one or more other parties is in progress, providing to the subscriber a request (e.g., a request icon) to receive a defined subset of messages;

(b) receiving, from the subscriber's communication device, the request for the defined subset of messages; and (c) presenting one or more of the messages in the defined subset of messages to the subscriber while the contact is in progress.

The request can be provided to the subscriber or rendered in any suitable manner. It can be configured as an icon displayed on a Graphical User Interface or GUI of the subscriber (which if clicked will return the request for the subset of messages), as a superimposed tone or beep or whisper on a Telephone User Interface or TUI, or accessible via a speech interface command, and the like.

The subset of messages is typically populated by performing a search using the telephone number and/or address pairs for the subscriber and one or more of the other parties to the contact. Alternatively, the subset of messages may be selected by matching at the group level meaning to all messages from any member of the group to which this address belongs. This allows groups to be formed y message thread, or "reply-all" set members. The identified messages can then be filtered, based on predetermined rules or user-defined preferences, to form the subset of messages. The subset of messages can be displayed only to the subscriber or, at the discretion of the subscriber, to one or more of the other parties to the contact.

The subset of messages can be presented in any suitable manner. For example, the subset can be displayed, played via audio, or a combination thereof.

In a fifth embodiment of the present invention, yet another method for providing message-related information to a contacting party is presented. The method includes the steps of:

(a) receiving a voice contact to a first communication device of a subscriber from a second communication device of a contacting party;

(b) effecting an audio session between a messaging system associated with the subscriber and the second communication device;

(c) thereafter performing one or both of the following steps:

(i) transforming the audio session into a graphical user interface-based audio session between the messaging system and the second communication device; and (ii) transforming the audio session into a session between the messaging system and the second communication device having a video channel or both audio and video channels; and (d) providing message-related information to the communication device of the contacting party via the transformed session.

The Graphical User Interface or GUI-based session is effected by any suitable techniques. In one technique, the session is a browser-based GUI-driven session. The audio content of the session can be transmitted by means of a circuit-switched or packet-switched network.

The video channel or dual audio/video channels-type sessions can also be effected by any suitable techniques such as in-band DTMF signaling speech commands. The audio and video content of the session can be transmitted by means of a circuit-switched and/or packet-switched network.

The various embodiments can have many advantages relative to existing communication networks. The present invention can, through the presence server and associated presence information database, provide a high degree of presence awareness in telephony networks improving application knowledge of currently available device capabilities associated with users. The presence server can continually collect and redistribute availability or presence information from publishing sources (such as a Private Branch Exchange or PBX, a service provider, and a messaging system) tailored to the needs and privileges of the person making the request (or his authorized agent). The presence server can reframe the abilities of existing Live-Call Services (such as PBX or peer-to-peer networks) as they interact with messaging services (such as voicemail, email, or unified messaging systems) to let appropriate notifications flow among these systems. In heterogeneous networks, when a communication is initiated through one system, appropriate notifications among all the systems can occur immediately. The various embodiments can allow simultaneous, dynamic correlation of message notification, presence and current call context and can interoperate with the public switched telephone network.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Overview of the Network Architecture

Figure 1:
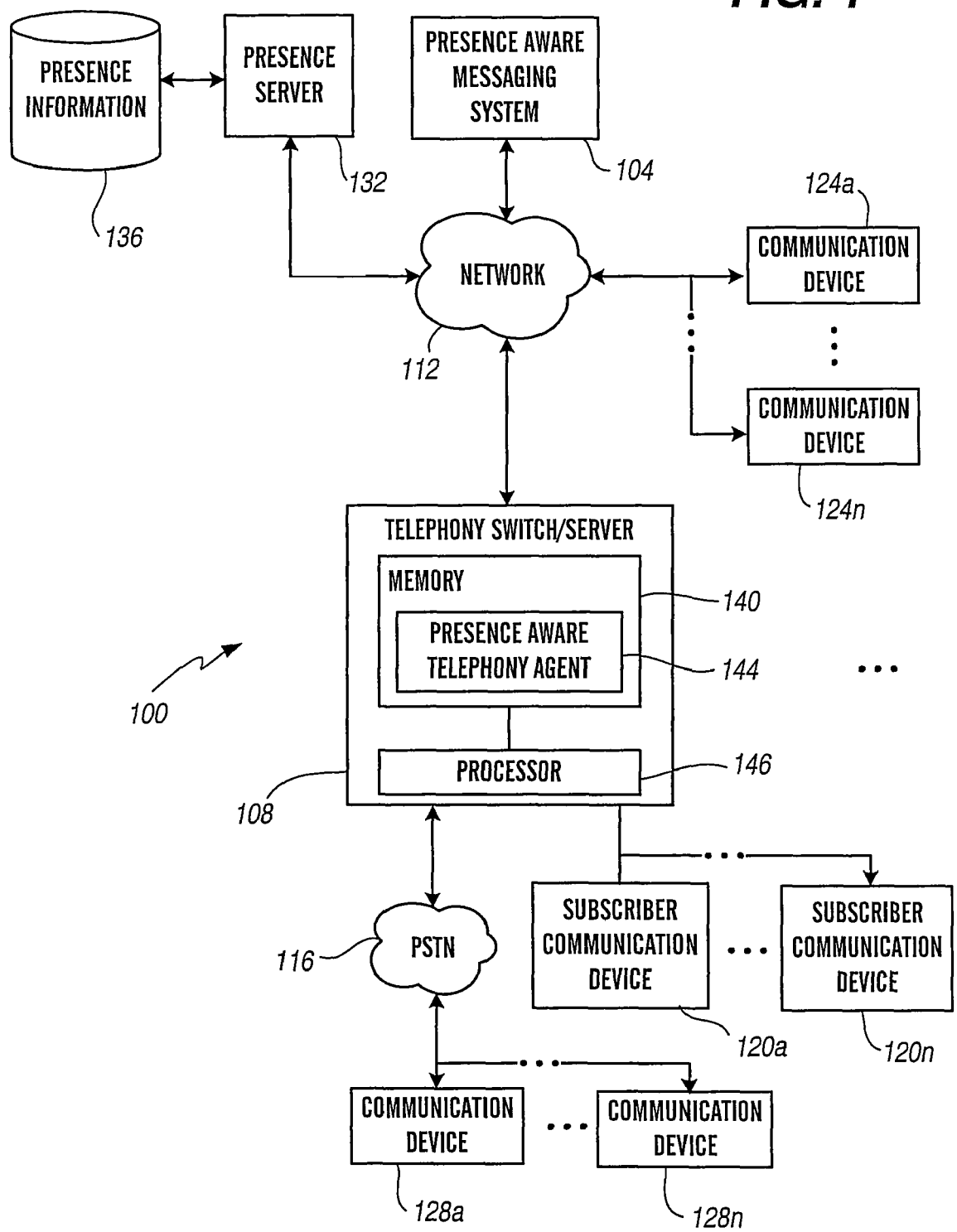
FIG. 1 is a block diagram of a presence aware communications network according to an architecture embodiment of the present invention.

FIG. 1 depicts a presence aware communications network according to a first architecture of the present invention. The presence aware communications network 100 comprises a presence aware messaging system 104 for receiving and storing messages for one or more users, a telephony switch/server 108 for directing contacts, a packet-switched network 112, a circuit-switched Public Switched Telephone Network or PSTN 116, a first plurality of communication devices 124*a-n* in communication with the network 112, a second plurality of communication devices 128*a-n* in communication with PSTN 116, a third plurality of communication devices 120*a-n* in direct communication with the switch/server 108, and a presence server 132 and associated presence information database 136 for providing presence information about one or more users of the various communication devices. As will be appreciated, presence aware messaging system 104, telephony switch/server 108, and presence server 132 can be implemented in software and/or hardware, depending on the application.

The presence aware messaging system 104 is a repository for various kinds of messages and can be any multi-media messaging system, such as AUDIX™, DEFINITY-AUDIX™, INTUITY™, or OCTEL ARIA™ or SERENADE™ and UNIFIED MESSENGER™, all by Avaya Communications, Inc., modified to perform the actions described below. As will be appreciated, the messages can be of various types and forms, such as voice messages or voice mail, e-mail, faxes, instant messages, paging signals, broadcasts, notices, alerts, calendar items, multimedia multi-part messages, and cross-media messages.

The telephony switch/media server 108 can be any architecture for directing contacts to one or more communication devices. Illustratively, the switch/server 108 of FIG. 1 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ or Multi-Vantage™ private-branch exchange (PBX)-based ACD system; or Nortel Networks' IPConnect™. The switch or media server 108 typically is a stored-program-controlled system that conventionally includes interfaces to external communication links, a communications switching fabric, service circuits (e.g., tone generators, announcement circuits, etc.), memory 140 for storing control programs and data, and a processor 146 (i.e., a computer) for executing the stored control programs to control the interfaces and the fabric and to provide automatic contact-distribution functionality. The switch/server 108 comprises a network interface card to provide services to the first plurality of communication devices 124*a-n*. Included in the memory 140 is a presence aware telephony agent 144 to interact with the presence server 132 when handling communications directed to a communication device. The presence server 132 is referenced by presence-aware telephony agent 144 on every initiated or terminated contact. Switch-server 108 can include a gateway (not shown) to provide signal control and conversion capabilities between the circuit-switched PSTN 116 or some other type of circuit-switched network and the packet-switched network 112.

The packet-switched network 112 can be any data and/or distributed processing network, such as the Internet. The network 112 typically includes proxies, registrars, and routers for managing packet flows.

The first, second, and third plurality of communication devices 124*a-n*, 128*a-n*, and 120*a-n*, respectively, can be any communication device suitable for the network to which they are connected. The first plurality of communication devices 124*a-n* are connected to the packet-switched network 112 and can include, for example, IP hardphones, IP softphones, Personal Digital Assistants or PDAs, Personal Computers or PCs, and laptops. The second and third plurality of communication devices 128*a-n* and 120*a-n* are commonly circuit-switched and can include, for example, wired and wireless telephones, PDAs, pagers, facsimile machines, and modems.

The presence server 132 collects published presence information about a communication device and/or user thereof and stores the collected information in the presence information database 136. The presence server typically retrieves presence information by querying against the user's identity as opposed to the device address. In the presence information database all presence information is indexed by a user's identity rather than device address. The presence server 132 provides the collected information to other network entities in response to queries. The presence server 132 can collect only information respecting the user's interaction with the various entities of FIG. 1 and/or other information provided directly or indirectly by the user when those entities publish their presence information to the presence server. The presence server 132 can interact with additional presence services (now shown) that continually collect and redistribute availability data from publishing sources authorized by the user.

On Line Presence While Accessing Mailbox

Figure 2A:
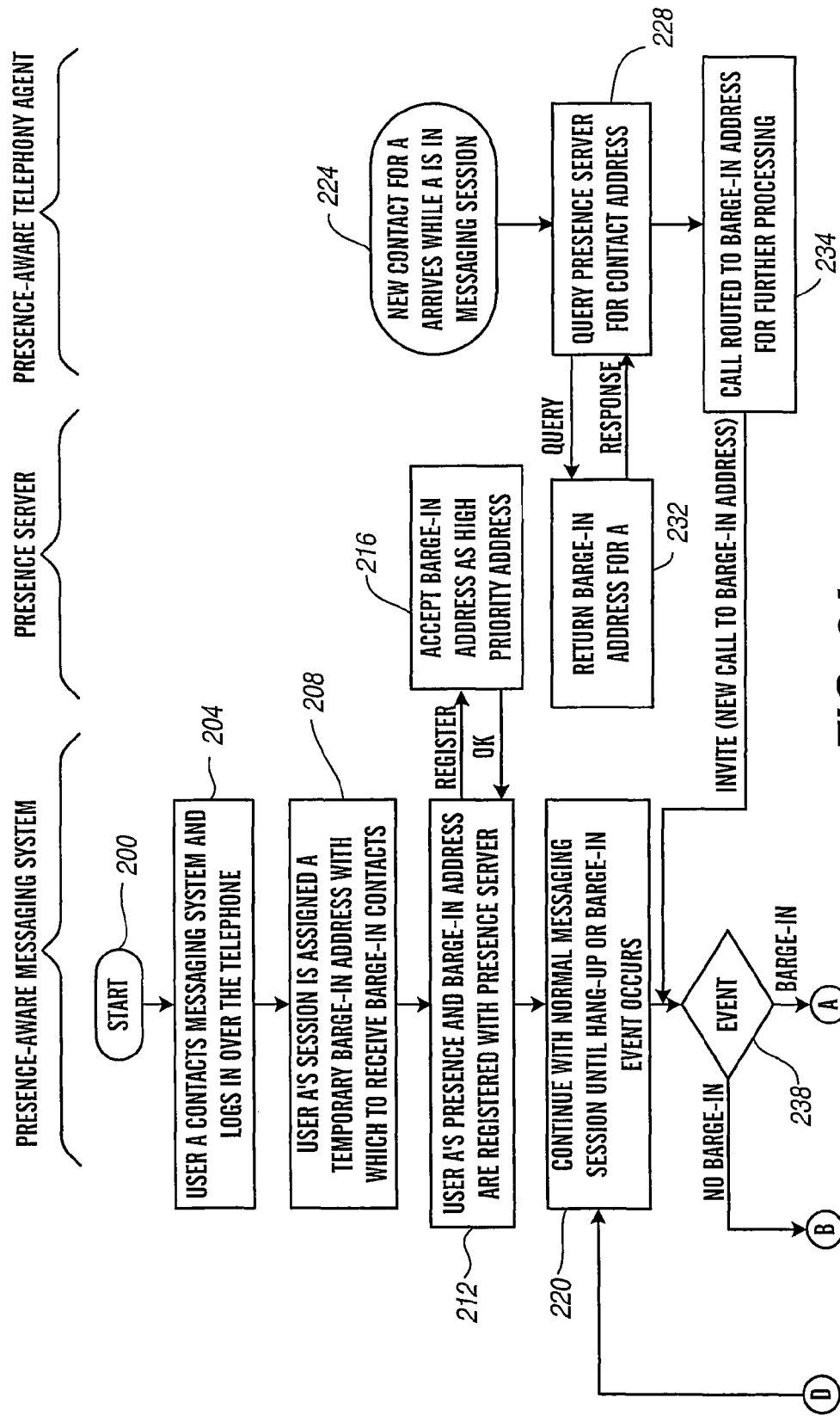
FIGS. 2A, 2B and 2C are flow charts according to a first operational embodiment of the present invention.
Figure 2B:
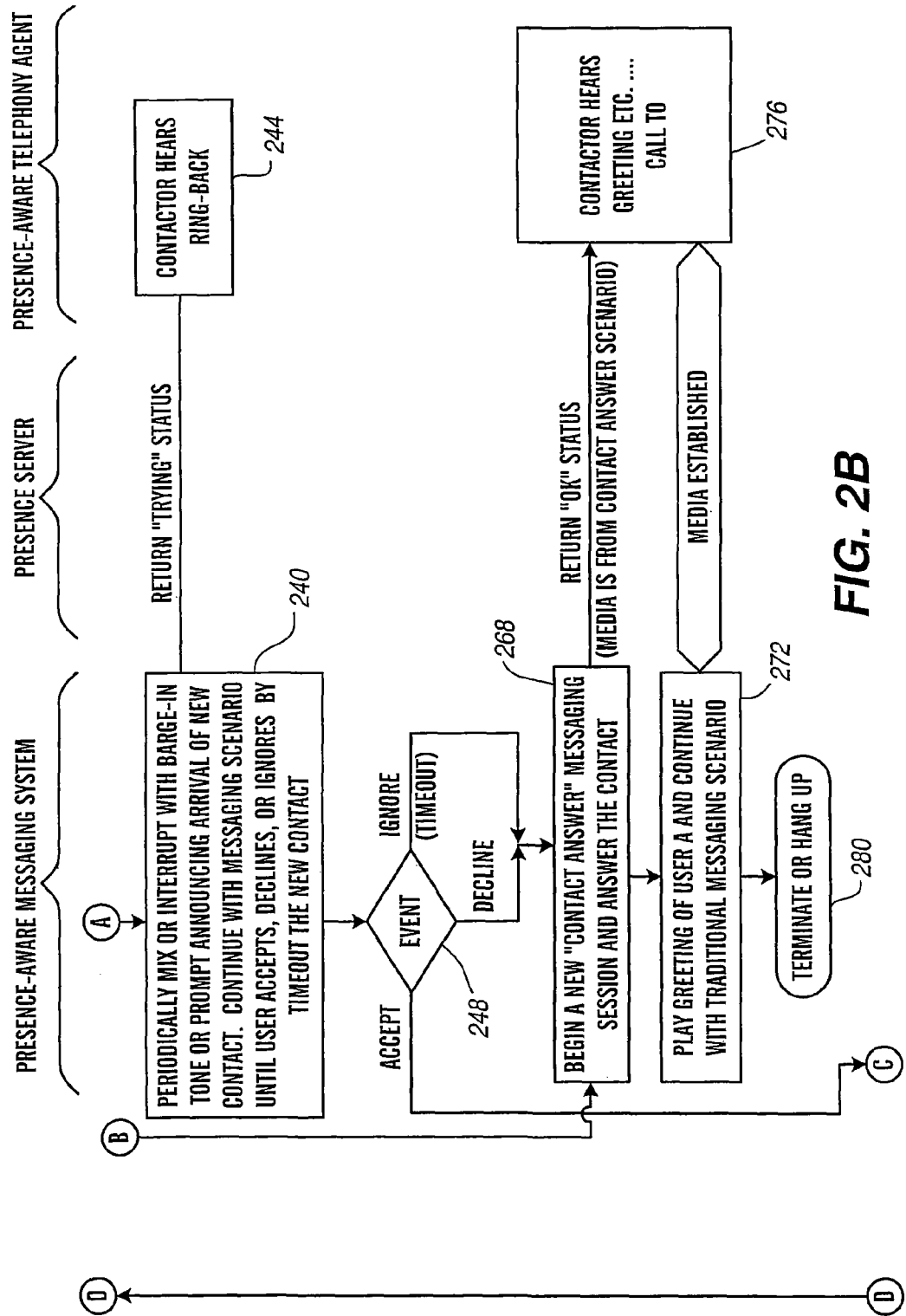
Figure 2C:
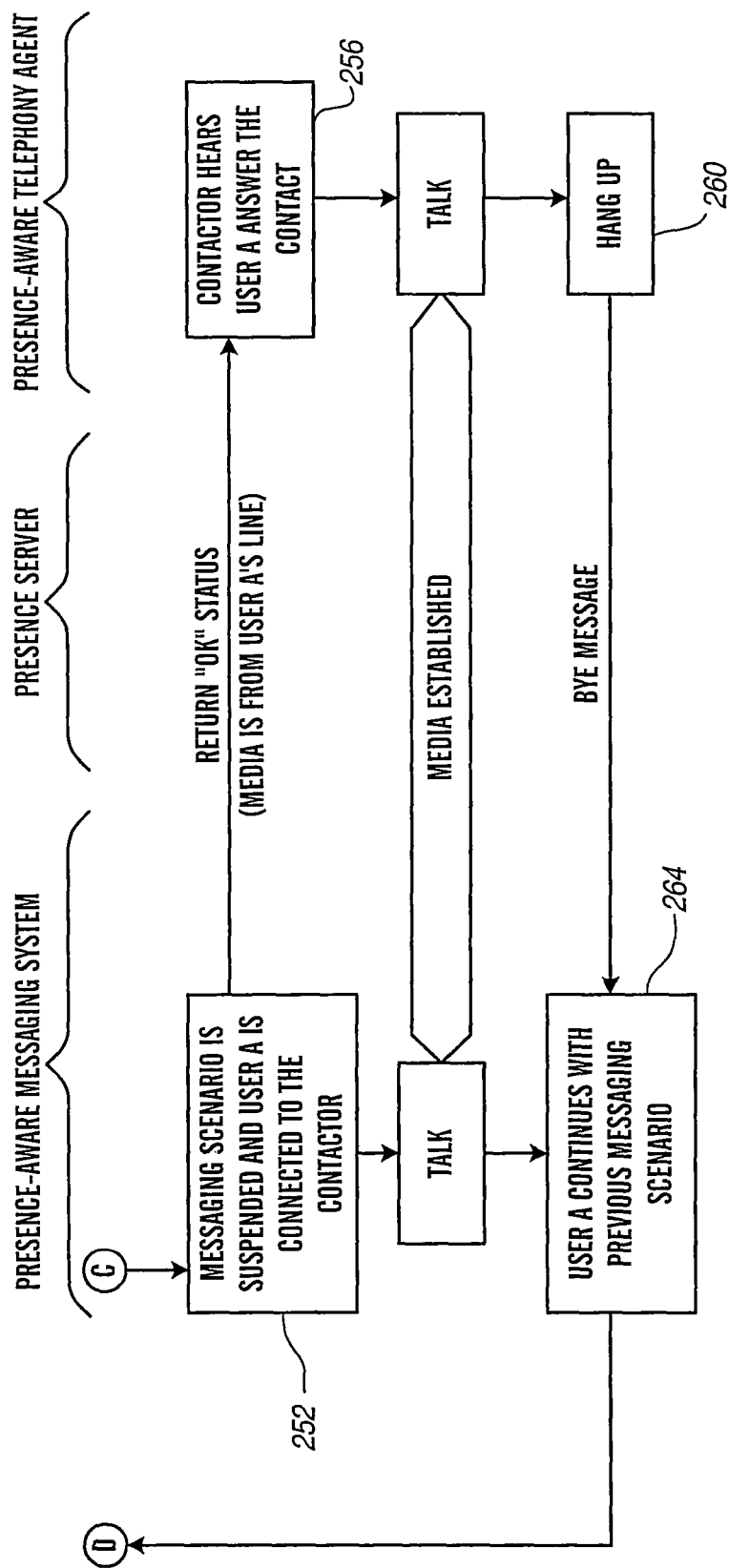

Turning now to FIGS. 2A, 2B, and 2C, the first operational embodiment of the present invention will be discussed using the communication network 100 of FIG. 1.

The embodiment is directed generally to a contact received when the user is engaged in a session with the messaging system 104. In an example of this embodiment, the user or subscriber contacts the presence aware messaging system 104 to retrieve messages. The system 104 announces the change in the user presence to the presence server 132 when the message retrieval session begins or ends. The server 132 updates the presence information in the presence information database 136 based on predetermined rules. When a later contact is received, the presence server 132 is queried and, unless otherwise specified by user configured rules mapped against the identity of the contacting party, provides the updated presence information. In the example, the presence information states that the user is available through the messaging system 104. The contact is directed to the messaging system 104, which announces a pending contact to the user and, if accepted, suspends the message retrieval session for the duration of the communication. When the communication is terminated, the message retrieval session continues from the point of suspension.

Turning now to FIGS. 2A, 2B, and 2C, a more detailed discussion of the embodiment will now be presented.

Before describing the steps of FIG. 2A, it is helpful to understand the registration process and how the registered default address is used under SIP. Regarding registration, the presence aware telephony agent 144 registers a default contact address for users of devices 120*a-n* with the presence server 132. Devices 120*a-n* may register directly or indirectly through the telephone agent. Registration is done by communicating a register message containing the default contact address (e.g., the telephone number or SIP address of the user's primary communication device (desk telephone)) from the agent 144 to the presence server 132. The presence server 132 accepts the default address and responds to the agent 144 with an OK message. In the event that a new contact arrives for the user before the user logs into the messaging system, the agent 144 queries the presence server 132 for the user's contact address. The presence server 132 returns the default address to the agent 144. The agent 144 then causes the contact to be routed to the default address for normal processing. The default address is the address used by the agent 144 until a higher priority address is registered with the presence server.

In action oval 200, the user contacts the messaging system 104 to initiate a messaging session and logs into the system 104. When the user has successfully logged onto the system and created a messaging session in step 204, the system 104 in step 208 assigns a temporary barge-in address to the user. In step 212, the system 104 sends a register message to the presence server 132 seeking registration of the temporary barge-in address with the presence server 132. In step 216, the presence server 132 accepts the barge-in address as the high priority (temporary) address (in lieu of the default address) for the user and returns on "OK" message to complete the registration process.

In step 220, the user continues with the messaging session until hang-up (or session termination) or a barge-in event occurs.

In action oval 224, a new contact arrives for the user while the user is in the messaging session. The agent 144 in step 228 queries the presence server 132 for the current address for the user. In step 232, the presence server 132 reviews address tables stored in the database 136 and returns contact information including the barge-in address to the agent 144. In step 234, the agent 144 causes the contact to be routed to the barge-in address for further processing. This is done by sending an INVITE message to the system 104. The INVITE message contains the codec, address, and listening port number of the contactor. The additional details of the INVITE and OK messages are set forth in the Session Description Protocol or SDP. As will be appreciated, SDP payload can include not only codec, address, and listening port for a simple audio session but also multiple channel media definitions and supporting parameters which can be used in any combination to establish a session.

In decision diamond 238, the system 104 determines whether or not to announce the contact to the user. This determination is typically based on pre-determined rules or policies, which can be configured by network administration and/or by the user.

If the system 104 determines that the contact is to be announced to the user, the system 104 in step 240 (FIG. 2B) announces the contact to the user using a barge-in message or signal and waits for further instructions from the user. As will be appreciated, the barge-in message or signal can be announced by any suitable technique, such as a zip tone, ring signal, or "whispered" announcement played to the subscriber using a TUI, a video message, a pop-up window, icon, or visual message or video announcement displayed on the user's Graphical User Interface or GUI or other visual or mechanical indicator as appropriate for the device in use. The content or form of the message or signal can be configured in any suitable manner by network administration or by the user himself or herself. In response to the barge-in signal, a user indicates an acceptance or decline of the contact, by taking an action such as pressing a button, clicking an icon, or speaking a command, and the like. Ignoring the signal will default to decline the contact. For telephone calls, the announcement and mode of user acceptance or denial can be configured to be similar to that used in conventional call waiting, though it can be implemented a number of different ways. The barge-in message can be periodically mixed with or superimposed on the system 104 output during the session or interrupt the messaging session briefly to insert its message to the user. Until a response is received from the user, the system 104 normally continues with the messaging session and sends a "TRYING" status message to the agent 144. In step 244, the agent 144 causes the contactor to hear a ring-back in the event that the contact is a telephone call (or circuit-switched contact) or to see a suitable text message or hear a suitable message in the event that the contact is a text or multi-media contact.

In decision diamond 248, the system 104 determines whether or not the user wants to accept the contact. This determination can be made by receiving a response from the user (accepting or declining the contact) in response to the announcement or by failing to receive a response from the user within a configurable time period. In the latter instance, the system 104 can be configured to conclude that the failure to receive a response or time out is the equivalent of a denial or acceptance. FIG. 2B shows the failure to respond or time out as being a denial.

When the contact is accepted, the system 104 in step 252 (FIG. 2C) suspends the messaging session and sends an "OK" message to the caller. The "OK" message contains the messaging system's address, and a codec, and listening port number allowing the caller to join the messaging user on the current session. In step 256, the calling device uses the parameters of the "ok" message and media is established by known techniques to permit the parties to communicate with one another. In step 260, when the caller hangs up a "BYE" message indicating that the new session is ended, is sent to the messaging system 104, terminating the new session. The messaging system 104 in step 264 confirms the end of the call, then resumes the messaging session, preferably at the point of suspension of the session, with the user. This is shown by the arrow returning to step 220 (FIG. 2A).

When the contact is not accepted, the messaging system 104 in step 268 (FIG. 2B) begins a new "Contact Answer" messaging session and answers the contact. This is done by returning an OK status message containing a suitable SDP payload to establish a separate session unique to the caller. When media is established, the messaging system 104 in step 272 plays the messaging system greeting to the contactor. In step 276, the contactor views and/or hears the greeting of the messaging system 104. The new messaging session with the contactor continues until termination or hangup in step 280.

Returning to step 238 (FIG. 2A), when the messaging system 104 determines that the contact is not to be announced to the user the messaging system 104 proceeds to step 268 discussed above.

As will be appreciated, when the user terminates the messaging session the messaging system 104 sends a REGISTER message to the presence server indicating that the session has ended. The presence server unregisters the barge-in address and re-registers the default address as the high priority address for the user.

Messaging Advice on Becoming Present

Turning now to FIGS. 3A, 3B, 4A, and 4B, variations of the second embodiment of the present invention will be discussed using the communication network 100 of FIG. 1.

The embodiment is directed generally to forwarding message-related information to the user when the user is present. In an example of this embodiment, the user at a remote network location goes online, registering with the presence server as being reachable through text-only instant messaging. The user may configure the messaging service to send current mailbox status to the user when he or she becomes available for instant messaging communication. When the messaging service, through subscription to the user's presence service, becomes aware of the change in user status, the messaging service sends an instant message to the user indicating the type and number of messages waiting or other requested status. Similarly, instant messages may also be sent to the user's currently indicated instant messaging service (given through his or her presence server) whenever the messaging service initiates a telephone answering session, sending the identity and call-back number of contactors unable to reach the user directly because of either a media mismatch or an existing contact or a service outage. The instant receipt of the calling number can help reduce telephone tag and voice-mail jail, if the recipient can employ alternate means to quickly return the call, the alternate means of placing the call need not be known to the presence server.

Figure 3A:
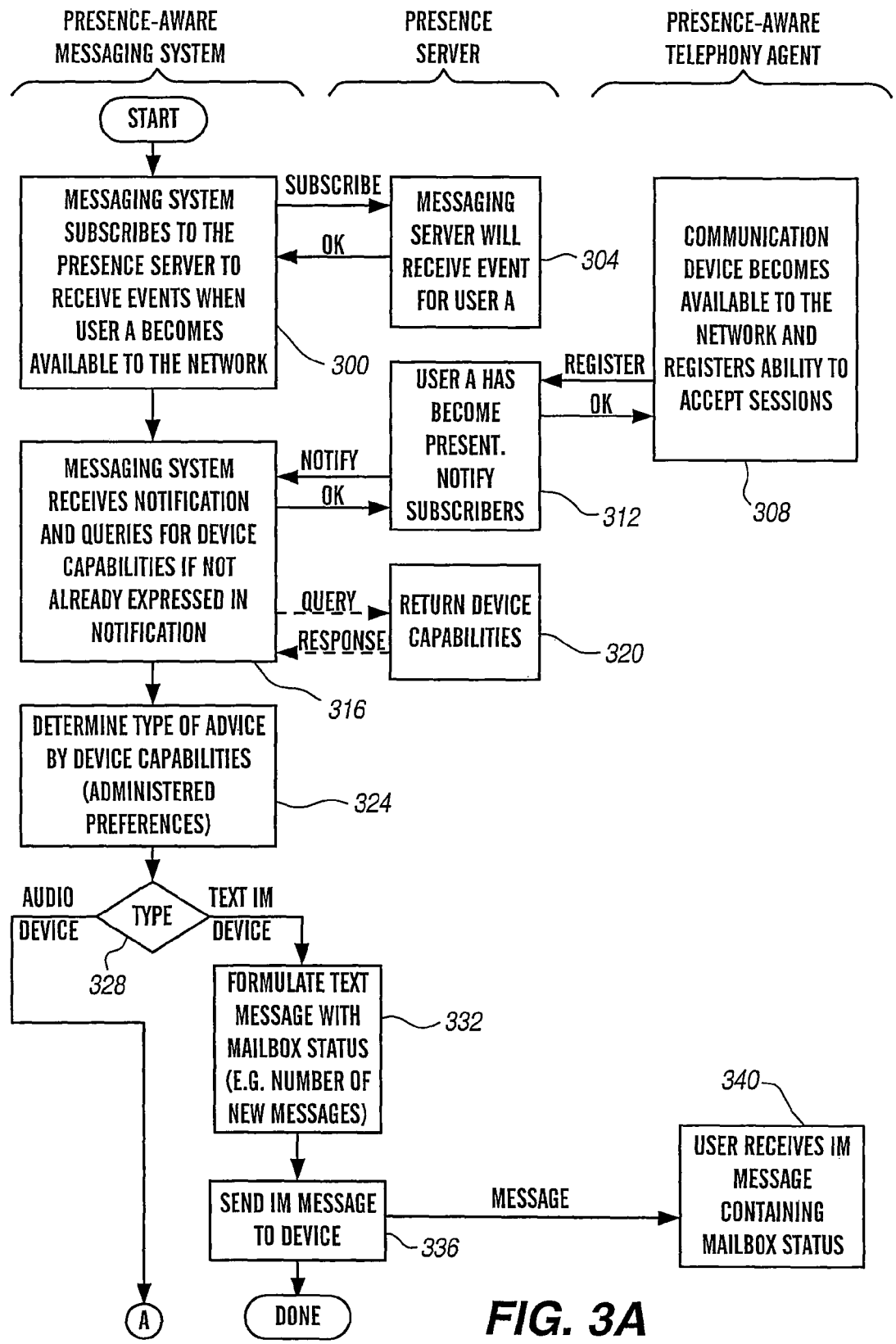
FIGS. 3A and 3B and 4A and 4B are flow charts according to a second operational embodiment of the present invention.
Figure 3B:
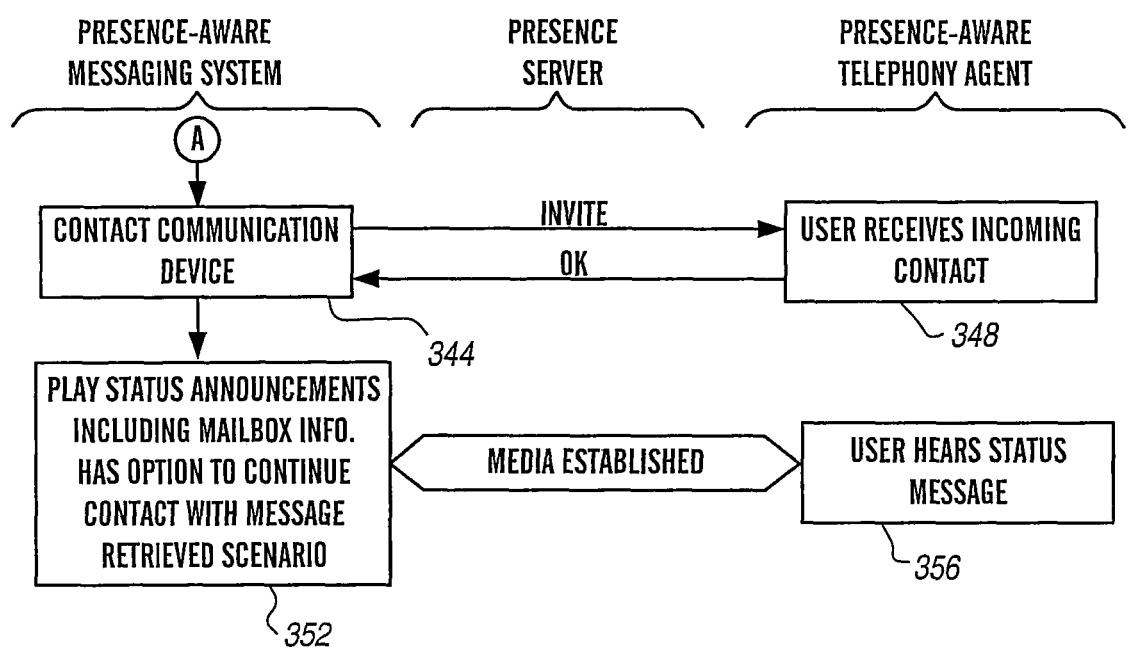

Turning now to FIG. 3A a more detailed discussion of a first variation of the third embodiment will now be presented.

In step 300, the messaging system 104 subscribes to the presence server 132 to receive events when the user becomes available to the network. This is performed by the messaging system 104 sending a SUBSCRIBE message to the presence server 132, and the presence server 132 in step 304 sending back an OK message.

In action step 308, a communication device (which can be one of the first, second, or third plurality of communication devices which is associated with the user) becomes available to the network. This occurs when the device sends a REGISTER message to the presence server 132 and the presence server 132 responds with an OK message, or when any presence publisher updates the status within the presence server.

In response to the REGISTER message, the presence server 132 in step 312 not only verifies that the communication device has a valid association with the user by performing a mapping operation with one or more tables stored in the database 136 but also determines whether or not any subscriptions have been received with respect to the user. In this manner, the presence server 132 will determine that the messaging system 104 has lodged a subscription with respect to the user and will send a NOTIFY message to the messaging system indicating that the user just became present. The NOTIFY message relays the current address of the recently registered device associated with the user.

In step 316 the messaging system 104 receives the NOTIFY message and sends an OK message to confirm the notification. Optionally, if the system 104 is unaware of the communication capabilities for the device, the system 104 can query the presence server 132 for the device capabilities. In step 320, the presence server 132 responds with the requested capabilities.

In step 324 and decision diamond 328, the messaging system 104, determines the type of advice to be forwarded to the user by analyzing the capabilities of the device and/or examining the administered preferences of the user, if any. "Advice" refers to information generated, derived, or accessible by the messaging system 104 that is associated with the user. What information qualifies as advice can be defined by the user and/or by system administrators. For example, "advice" (or message-related information) is typically summary information, but can be any information relating to the messaging service including information contained in voice mail messages, e-mail messages, multimedia messages, calls received for the user for which no message was left, the state of dynamic greetings, alerts, notices, broadcasts, and the like. Examples of such information include a number of new or unheard messages in the user's mailbox, a list of recent missed callers, summaries of the contents of voice and/or text messages, reminders, alerts, and the like. The nature and extent of ongoing advice is configurable by user and system administration.

When the newly registered device is a text instant messaging-capable device, the messaging system 104 in step 332 formulates a text message containing the type of advice desired according to previously administered preferences. The instant text message is sent to the user in step 336. The newly registered device associated with the user receives the instant text message in step 340. The user can act on or ignore the instant message, as desired.

When the newly registered device is an audio capable device, the messaging system 104 may be administered to immediately place a call to the device. The messaging system 104 in step 344 (FIG. 3B) sends an INVITE message (containing the system's SDP payload) to the newly registered device. In response, the device in step 348 sends an OK message (containing the device's SDP payload). After media is established, the messaging system 104 in step 352 then plays announcements including the user's advice, e.g., mailbox information. The user hears the status message in step 356 and can act on or ignore the instant message, as desired.

Figure 4A:
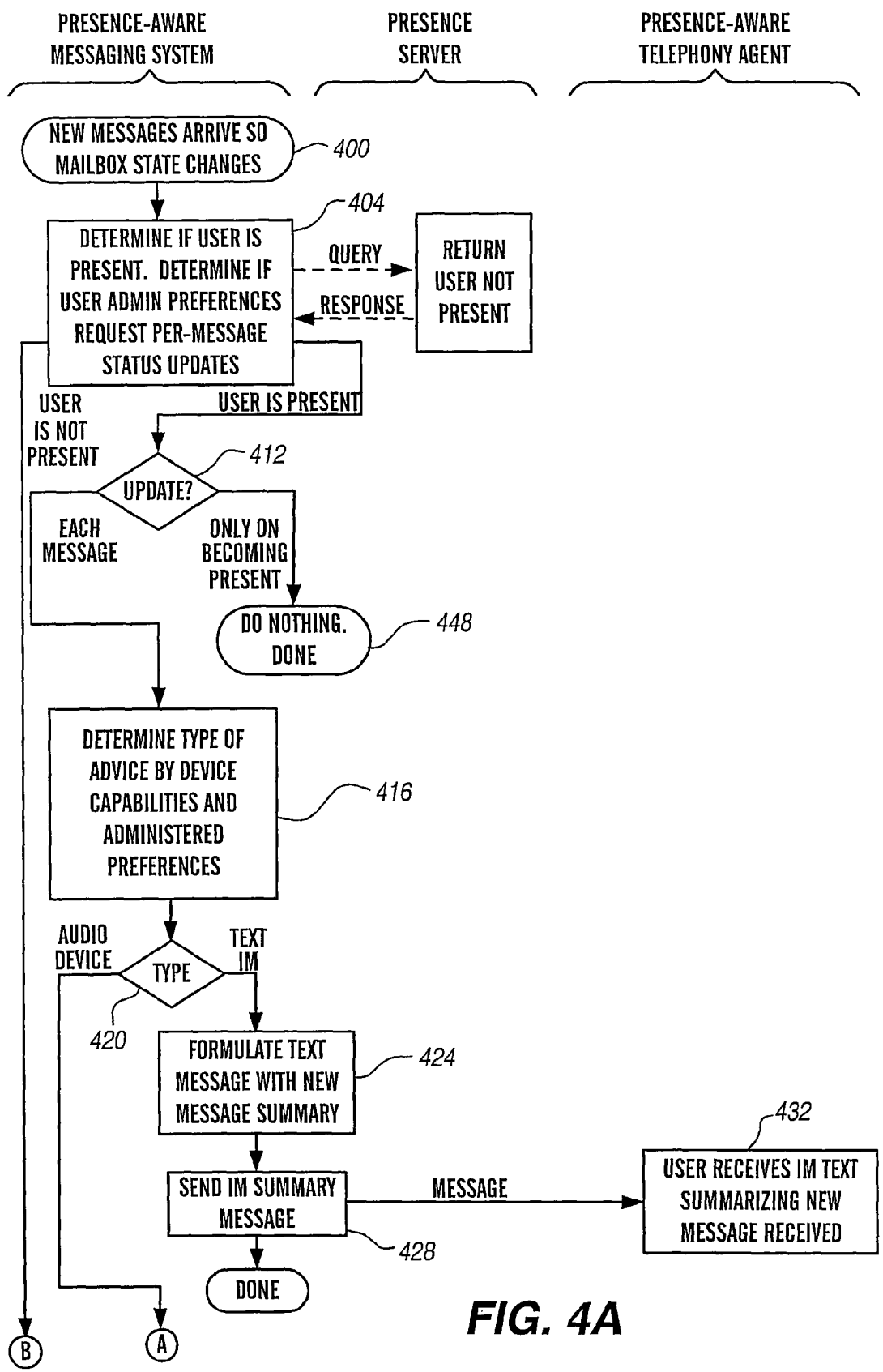
Figure 4B:
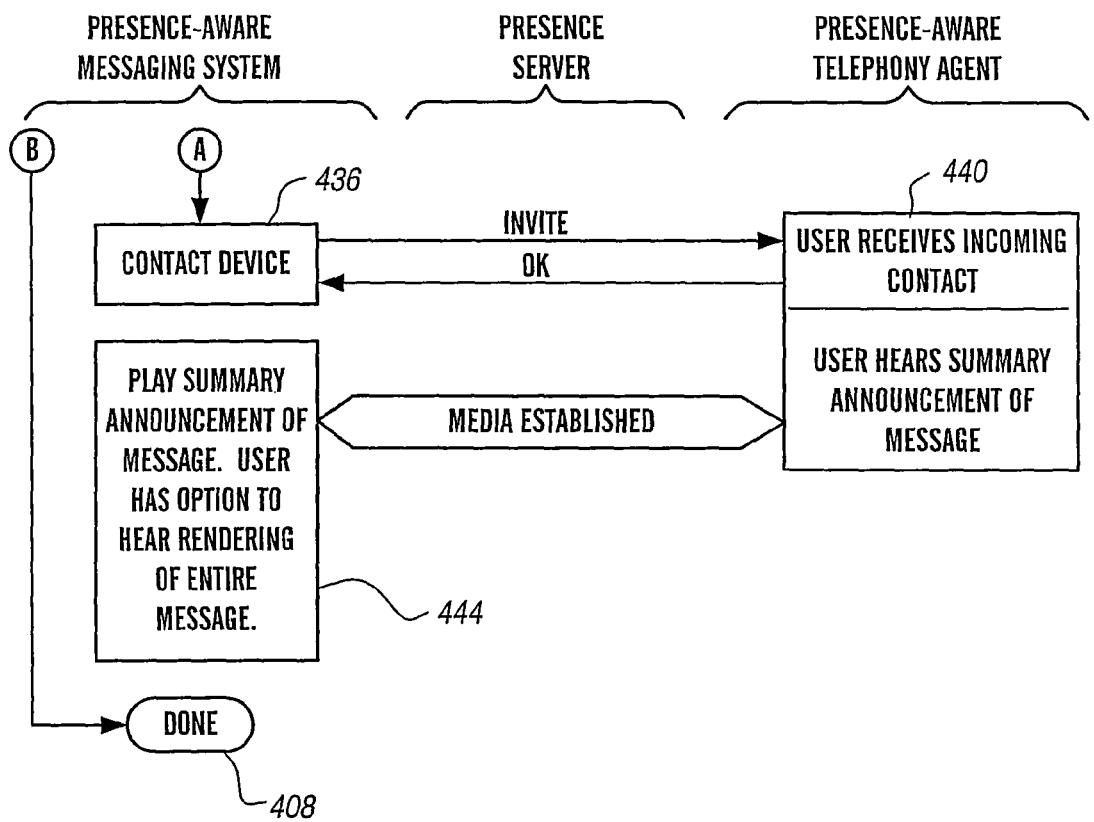

Turning now to FIG. 4A, a second variation of the second embodiment will now be presented.

In action oval 400, the one or more messages arrive for the user and the information in the messaging system 104 for the user (e.g., the user's mailbox status changes).

In response, the messaging system 104 in step 404 determines if the user is present and available to the communications network by querying the presence server 132. The determination can be based on any suitable criterion, such as whether there is an (unexpired) registered address, whether the user recently registered a device within a selected period of time or has an unexpired registered (nondefault) device, whether the user recently used a device within a selected period of time, whether the device is currently in use, etc.

When the user is not present and available to the network, the system 104 proceeds to step 408 and terminates operation. The user will receive an update when he or she next registers a device with the presence server 132.

When the user is present and available to the network, the system 104 in decision diamond 412 determines, based on administrative rules and/or user preferences, what type of and the frequency of updates the user is to receive. In the case of multiple available devices, administrative settings determine how many devices are contacted and in what order.

When the update is to be on a per-message basis, the messaging system 104 in step 416 determines the type of advice by the registered user device capabilities and the user's administered preferences. In decision diamond 420, the system 104 determines the type of the device. For a text instant messaging-capable device, the messaging system 104 in step 424 formulates a text message with the advice. The advice typically includes a summary of new message(s). The instant text message is sent to the user in step 428. The registered device associated with the user receives the instant text message in step 432. The user can act on or ignore the instant message, as desired. When the registered device is an audio capable device, a call will be placed to the device. The messaging system 104 in step 436 (FIG. 4B) sends an INVITE message (containing the SDP payload of the messaging system) to the registered device. In response, the device in step 440 sends an OK message (containing the SDP payload of the device). After media is established, the messaging system 104 then plays announcements in step 444 including the user's advice. The user has the option of reviewing the entire new message. The user can act on or ignore the instant message, as desired.

As will be appreciated, the user can configure the system 104 to provide updates on a more or less frequent basis than on a per-message basis. For example, the user can request an update after expiration of a selected period of time or after a selected number of messages is received (e.g., every second, third, or fourth message). Further, it can be configured not to send per-message advice to a device that had previously been alerted by a caller who subsequently on the same call attempt left a "call answer" message in the mailbox.

When the update is not on a per message basis, the messaging system 104 in step 448 (FIG. 4A) terminates operation. The user, in this instance, will receive updates only when he or she initiates a messaging session.

Messaging Advice on Making a Contact

Turning now to FIG. 5, the third embodiment of the present invention will be discussed using the communication network 100 of FIG. 1. As described here, presence aware telephony agent 144 is configured to query the presence server 132 as it initiates or completes any contact, to determine the currently-valid contact device associated with the contact address. As will be appreciated, the presence information could be entirely contained within the telephone switch/server 108 in which case the messaging system 104 would be queried directly by switch/server 108 for any user configured to receive advice on making a contact. Other arrangements could also be made such as monitoring the internal call flow within switch/server 108 using a CTI integration technique, or installing vector steps within the switch to query outside resources while routing a call. Such changes in implementation are claimed as alternate embodiments of this invention without departing from the intent or scope of the invention.

The embodiment is directed generally to directing contact-related messaging information to the user when the user is in the process of making or initiating a contact. In an example of this embodiment, a user wishes to make a contact, such as a telephone call. During the contact set-up, the presence server 132 of the contacting party is queried to determine how to complete the call. At this query step, the user's or contacting party's presence server queries the contacting party's associated messaging system 104 to determine if there is an unheard message from the contacting party. If so, the contact is established with the contacting party's messaging system, announcing the unheard message and giving the contacting party an opportunity to consider it before the contact is made with the party to be contacted. Otherwise, the contact is completed directly.

Figure 5A:
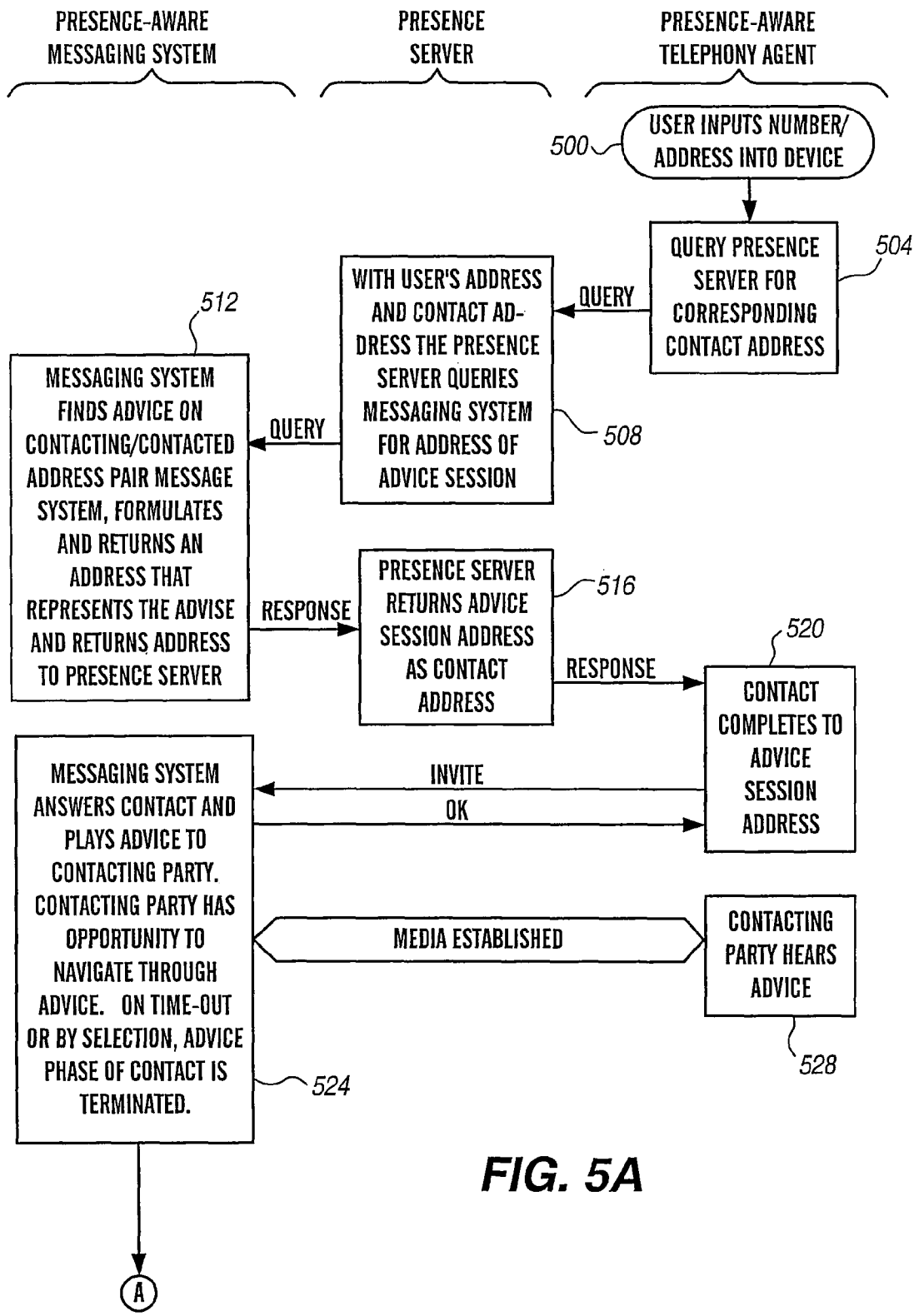
FIGS. 5A and B are flow charts according to a third operational embodiment of the present invention.

Turning now to FIG. 5A, a more detailed discussion of the third embodiment will now be presented.

In action oval 500, the user dials a telephone number or enters an address into his or her communication device.

In response, the agent 144 in step 504 queries the presence server 132 for a contact address corresponding to the entered number/address.

In step 508, the presence server 132, determines from administered data the calls placed by this user should be provided with messaging advice. As a consequence, the user address and destination contact address are sent as a query to messaging system 104 to establish the address of an advice session.

In step 512, the messaging system 104 locates the advice on the contacting party's and contacted party's address pair (s). This is typically performed by searching the appropriate fields of the message store for the pair. The possible address pair(s) are obtained from the presence server(s) of the contacting and contacted parties and can be the inputted address and/or telephone number only or one or more other addresses or telephone numbers associated with the selected party. Where multiple addresses/telephone numbers are associated with multiple communication devices of each party, all of the possible address pairs can be searched by the system 104. In one configuration, the system 104 searches the contacting party address field of the contacting party's message store for the entered (real) contact address. Once the related messages are identified, the messaging system 104 allocates communication resources to complete an advice session and the messaging system 104 then returns an address associated with an advice session relating to the located message(s) to the presence server 132. Because of the wide variety of possible communication devices that can be associated with each party, the located message(s) can be a mixture of differing message types, e.g., one or more of text messages, voice messages, paging messages, fax messages, instant messages, etc.

The presence server 132 in step 516 returns the advice session address to the contacting party's communication device as the contact address instead of returning the real contact address.

In step 520, the contact completes to the advice session address. This is done by the communication device sending to the messaging system 104 an INVITE message containing the SDP payload of the device, and the messaging system 104 responding in step 524 with an OK message containing the SDP payload of the messaging system. After media is established, the messaging system plays the advice to the contacting party. The contacting party hears the advice in step 528 and has the opportunity to navigate through the advice.

Figure 5B:
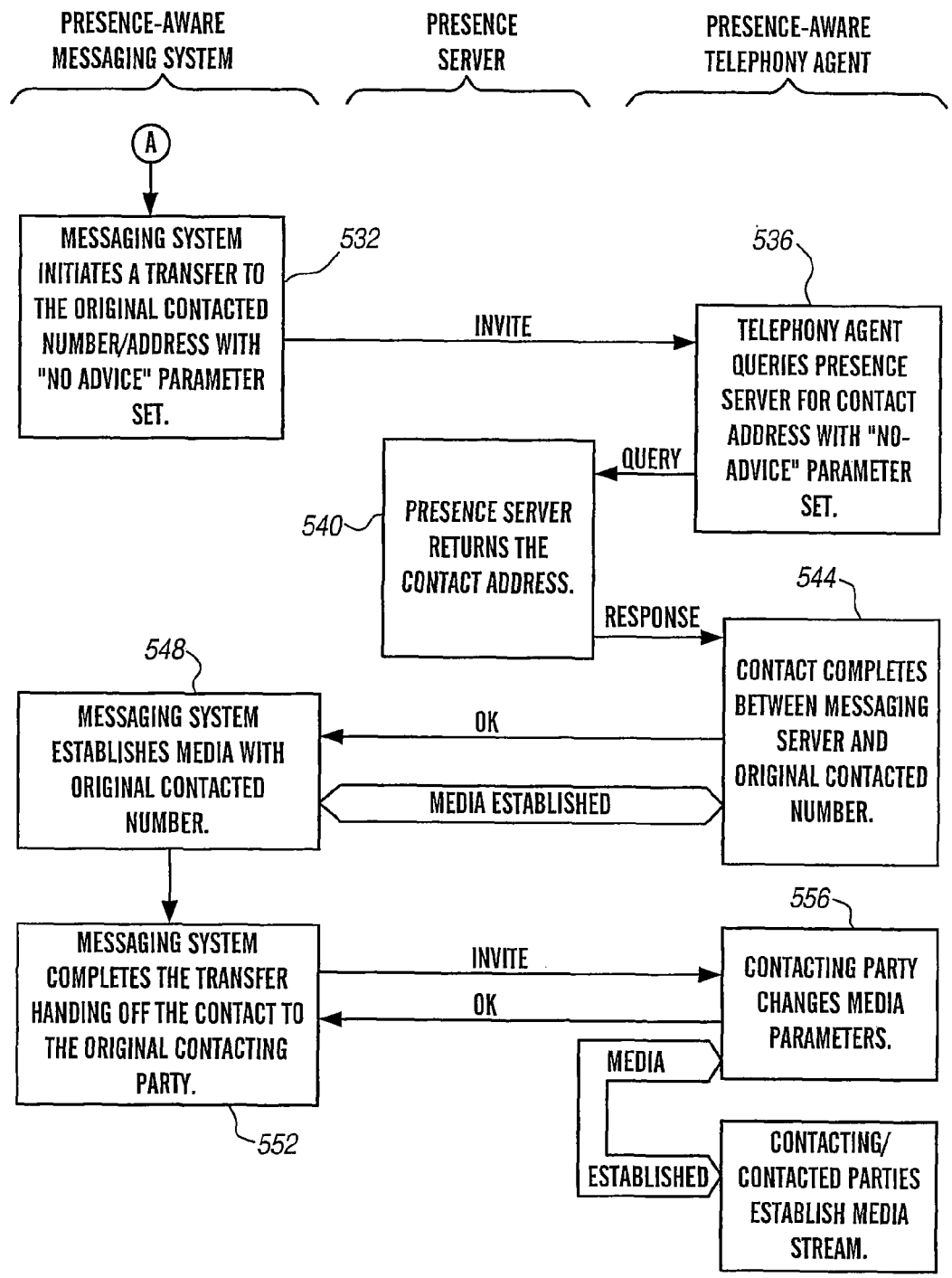

Upon time-out or upon the contacting party's successful completion (message review) or early termination of the advice session and if the contacting party still wants to make the contact, the messaging system 104 proceeds to step 532 (FIG. 5B). In step 532, the messaging system 104 initiates a transfer to the real contact address by sending an INVITE message with a "no advice" parameter or flag set. The INVITE message contains the SDP payload of the messaging system. As will be appreciated when the flag is not set, the presence server queries the messaging system for advice and when the flag is set the presence server does not query the messaging system for advice. The flag is used to avoid an endless loop.

In step 536, the agent 144 queries the presence server 132 for the contact address with the "no advice" flag set in the query.

The presence server 132 in step 540 returns to the agent 144 the (real) contact address corresponding to the number/address entered by the contacting party.

In steps 544 and 548, the agent 144 sends an OK message to the messaging system 104 containing the SDP payload of the communication device of the party to be contacted, and media is established between the messaging system and the contact address of the party to be contacted. This is an important, but transient step, in transferring the original contact to the intended recipient.

Immediately, in steps 552 and 556 the messaging system 104 sends an INVITE message containing the SDP payload of the communication device of the party to be contacted to the communication device of the contacting party, and the device responds with an OK message. This completes the transfer handing off the parameters of the contact to the contacting party's communication device. Media is established between the contacting party's communication device and the contacted party's communication device.

As will be appreciated, the role of the messaging system in transferring the contact to the user's communication device after the contact is initiated with the device of the party to be contacted can be hidden from the contacted party. This can be accomplished by the messaging system temporarily altering its identity as presented to the contacted device such that the contacting party's or user's identification is recognized by the device instead of that of the messaging system.

Messaging Advice for a Current Contact

Figure 6:
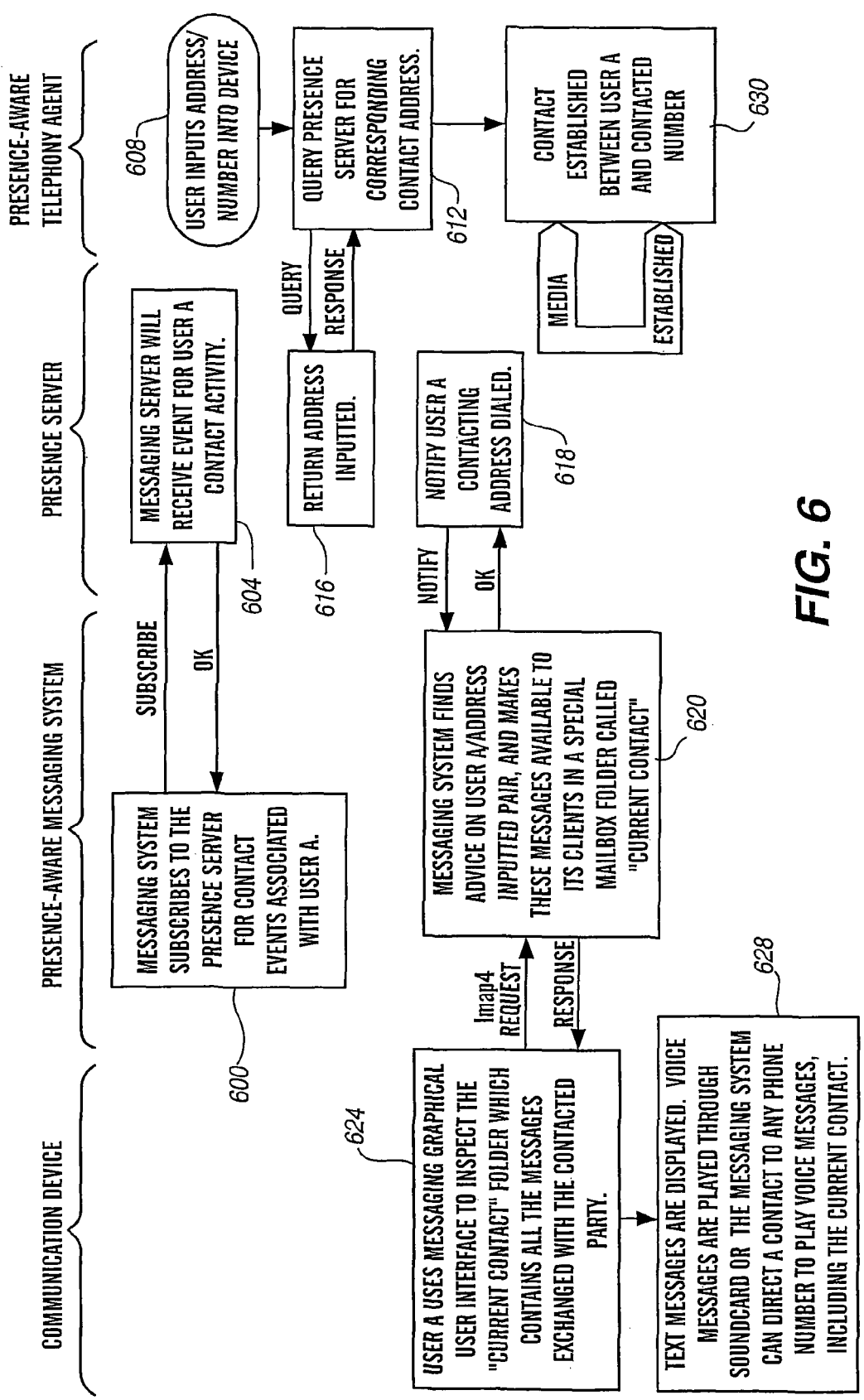
FIG. 6 is a flow chart according to a fourth operational embodiment of the present invention.

Turning now to FIG. 6, the fourth embodiment of the present invention will be discussed using the communication network 100 of FIG. 1.

The embodiment is directed generally to providing automatically message-related information to the user during the course of a contact. In an example of this embodiment, the messaging service registers to receive incoming and/or outgoing contact event notification from the presence server relating to a user. When a live contact is in progress, the messaging system can display to the devices of the contacting party a command button (or receive a key command) to display a defined subset(s) of messages (sent, received, read, unread, etc.) which have thus far (or recently) been associated with communications between/among the parties. Message headers are displayed on screen for reference during the contact. Message contents are rendered when selected as appropriate, e.g., voice message playback can occur in a whisper mode or conferenced playback to the user's handset in the contact, or may be diverted to another associated device or PC soundcard at the discretion of the user. Text contents are displayed on an associated screen.

Turning now to FIG. 6, a more detailed discussion of the fourth embodiment will now be presented.

In step 600, the messaging system 104 subscribes to the presence server 132 for contact events associated with the user. This is done by sending a SUBSCRIPTION message to the presence server 132. In step 604, the presence server 132 responds with an OK message.

At a subsequent time, the user in action oval 608 inputs an address (e.g., a telephone number) associated with one or more other parties. In response, the agent 144 in step 612 queries the presence server 132 for the contact address or route instructions associated with the inputted address.

In step 616, the presence server 132 responds to the agent with the contact address or route instructions, associated with the inputted address and, in step 618, sends a NOTIFY message to the messaging system 104. The foregoing step allows the messaging system to passively monitor the state of the user's communication devices. Conventional call processing continues until the contact is established at step 630.

In step 620, the messaging system 104 finds the set of messages relating to the paired contact addresses of the user's communication device and the other party's/parties' addresses(s) to be contacted and makes these messages (which can be of differing types) available to the user in a special mailbox folder or data structure entitled "current contact". Unlike eligible messages of the prior embodiment, which typically include only unheard messages, the messages included in the folder typically include not only unheard messages but also previously heard (historical) messages that have not been deleted by the user.

As part of this embodiment, the communication device(s) of the user are configured to make requests for the "current contact" folder. The configuration can be a visual indicator, popup screen, icon keyword or key press that, if selected, indicates a desire to access the set of messages in the "current contact" folder or data structure.

In step 624, one of the communication devices associated with the contact makes a request for the current call folder contents. The device sends a request, typically an IMAP4 request or a Post Office Protocol or POP3 request, to the messaging system 104 for the folder. The messaging system 104 responds with the data address of the folder in the database or the folder itself. In step 628, the message headers in the folder are displayed to the user.

Message headers are displayed on screen for reference during the contact. Message contents are rendered when selected as appropriate, e.g., voice message playback can occur in a whisper mode or conferenced playback to the user's handset in the contact, or may be diverted to another associated device or PC soundcard at the discretion of the user. Text contents are displayed on an associated screen.

As will be appreciated, the messaging system could also subscribe or only subscribe to the switch/server 108 for passive monitoring of a user's current contacts.

It is to be understood that the embodiment can be configured not only to permit only the requesting party the ability, in isolation, to access the contents of the folder but also to permit, at the option of the requesting party, the requesting party to share selected contents of the folder. For example, selected voice messages could be bridged onto the current contact at the discretion of the requesting party or selected text messages could be forwarded to the devices of one or more of the parties (as selected by the requesting party or user) for viewing.

Messaging Advice to Contactor on Covered
Incoming Call

Figure 7A:
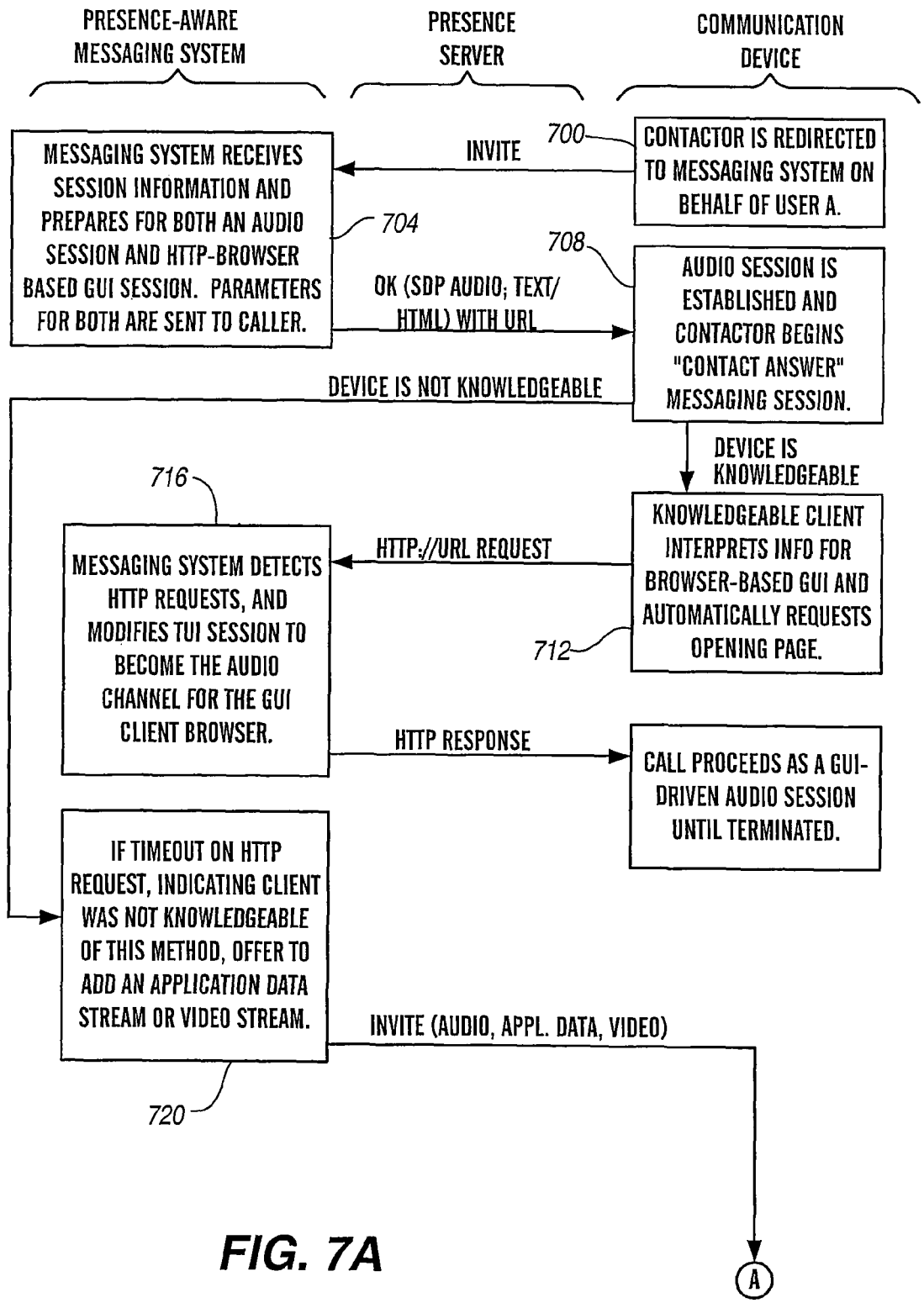
FIGS. 7A-C are flow charts according to a fifth operational embodiment of the present invention.
Figure 7B:
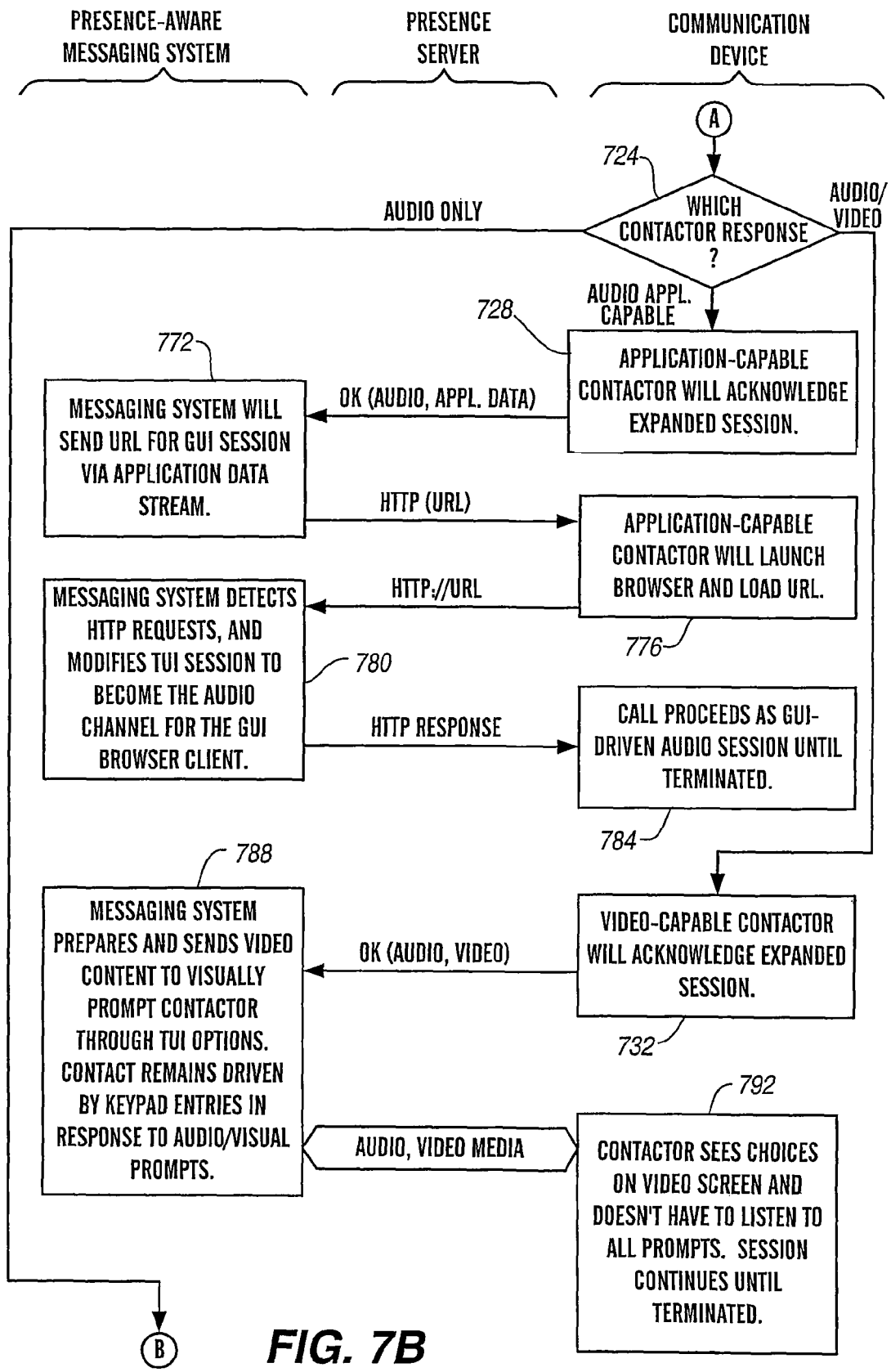
Figure 7C:
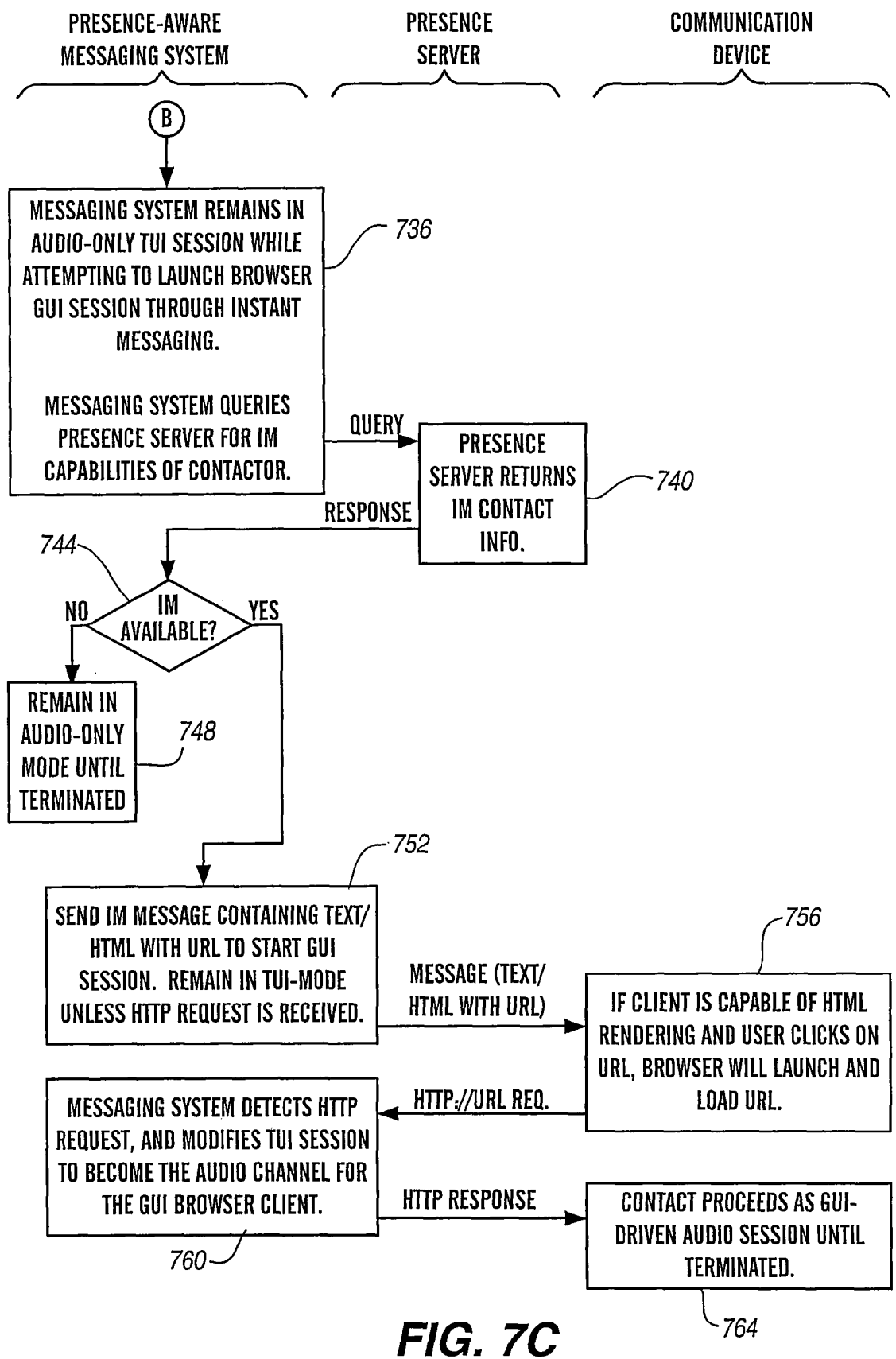

Turning now to FIGS. 7A-C, the fifth embodiment of the present invention will be discussed using the communication network 100 of FIG. 1.

The embodiment is directed generally to bridging live-call and messaging domains by returning session transformation information to the contacting party through signaling protocols. In an example of this embodiment, the communication device of the contacting party receives an indication that the contact is being completed to the messaging system on behalf of the party to be contacted. The device also receives additional information about the state and capabilities of the mailbox that the device has been redirected to.

Transformation information refers to those signaling parameters and capabilities exchanges necessary to promote a simple live audio-only communication session into a GUI-enabled multimedia communication session. Even though initiating devices may be multimedia-capable, most session establishment requests are for simple audio connections because the majority of reachable communications devices only support audio. Session transformation allows a simple audio connection request to terminate on a messaging system which then is able to promote enhanced session capabilities and transform the session into a GUI-enabled multi-media session under control of the contactor providing that the initiating device responds to multimedia capabilities. Transformed sessions may continue to be done in synchronous real-time (such as an audio/video call) or may be done in client/server asynchronous transaction mode (such as when browsing a multimedia web page). The TUI-channel remains operational through the transformation, and becomes a directed audio channel under graphical control after the session is transformed.

One example of transformation information supports directing the contactor to a Universal Resource Locator or URL allowing the contacting device to drop out of synchronous communication mode and use an alternative, asynchronous method of interaction and message delivery such as via a Web call answering technique as discussed in U.S. Pat. No. 6,038,296 to Brunson et al., which is incorporated herein by this reference. In this example, the contactor is able to view a variety of labeled URL's representing information normally made available to all contactors. For example, links are available to the currently-active greeting; the text of the out-of-office reply string; alternate contact information including information on covering associates; an indication that one or more unheard messages from the contacting party may still exist in the mailbox, and the like. Knowledgeable contacting devices can use this information to enhance the experience of the contacting party by placing the contacting party in a web-based graphical user interface with full selection and composition control, rather than at the mercy of the strict response behavior expectations (e.g., time-sensitive, highly modal) characteristics of a live call-answer scenario.

Several alternate methods are attempted to establishing a web-based multimedia session in place of the initial TUI-based session. If these fail, a final attempt to establish a video session is made wherein the messaging system provides screen-based prompts for the contactor but still responds to touchtone or speech input. If session transformation is not possible, the contact continues as a TUI-based session.

Turning now to FIGS. 7A-C, a more detailed discussion of the fifth embodiment will now be presented.

The event(s) preceding the steps discussed below should first be discussed. Specifically, the communication device of the contacting party has contacted the switch/server requesting connection to the user. In step 700, the agent 144 has queried the presence server 132 for the contact address of the user and has been given the contact address of the messaging system 104. This can occur for example when the default address is unavailable (e.g., busy) or when the device is not answered by the user. The agent 144 then sends to the messaging system 104 an INVITE message containing the SDP payload of the contacting communication device.

In step 704, the messaging system 104 in response to the INVITE message prepares for either or both an audio session and a GUI session, such as an Hypertext Transfer Protocol or HTTP-based browser session. Both session types are offered in the "ok" response regardless of the known capabilities of the contacting communication device. The session parameters are transmitted to the contacting communication device as an SDP payload and text/HyperText Markup Language or HTML with an associated URL in an OK message. The URL is the URL that the messaging system 104 prepared in the previous step associated with the contact.

There are various ways to initiate the GUI session. Generally, a browser-based GUI session is initiated as noted above for purposes of interactivity with the calling party and therefore convenience of the calling party. The browser can also be enabled through an instant message containing the URL. When the contacting party clicks on the URL the browser session is initiated. Alternatively, a video channel associated with the audio session can be enabled for the contacting party. The video channel would convey a mapping of the keys of the contacting party's keypad or keyboard with respective options. The messaging system 104 can attempt to set up the GUI-session using sequentially combinations of the various techniques noted above until one of the options is successful.

In step 708, the audio or Telephone User Interface (TUI) session is established and the contacting party's communication device presents a call answer audio messaging session. In step 712, the device, if knowledgeable, interprets the received HTML text and URL for the browser-based GUI session and automatically transmits to the URL an HTTP request for an opening page for the session.

The messaging system 104, in step 716, detects the HTTP request and modifies the TUI session to become the audio channel for the GUI browser client or the contacting party's communication device. In other words, the TUI session becomes an audio support for the screen display on the GUI rather than providing an independent and unrelated flow of audio information to the contacting party (e.g., rather than playing press "one" for option X and "two" for option Y the TUI session plays "click [location W] to leave a high priority message and click [location Z] to erase your message or simply, "please make your selection"). The messaging system 104 provides an appropriate HTTP response to the contacting party's communication device. The contact thereafter proceeds as a GUI-driven audio session until terminated by the contacting party. As noted, the contacting party can review permitted information in the message store of the messaging system 104 during the session.

Returning to step 708, the device if not knowledgeable, will not respond to the URL information sent in the "ok" response and the messaging system will time out (while still supporting the TUI session). The messaging system 104 in step 720 offers to the contacting communication device the addition of an application data stream or video stream. This is done by transmitting an appropriate INVITE message to the contacting communication device. Generally, the INVITE message contains audio application and video data.

In decision diamond 724 (FIG. 7B), the contacting communication device determines, based on its capabilities and/or the preferences/real time input of the contacting party, which of three responses to send to the messaging system 104. In a first response, the contacting communication device returns an OK message with an SDP payload an audio only session. In a second response, the contacting communication device in step 728 returns an OK message with an SDP payload for an audio session and data for application capable. In a third response, the contacting communication device in step 732 returns an OK message with an SDP payload for both audio and video sessions.

When the first response is received by the messaging system 104, the messaging system in step 736 of FIG. 7C remains in an audio-only TUI session while attempting to launch a browser GUI session through instant messaging. The messaging system 104 queries the presence server 132 for the instant messaging capabilities of the contacting communication device. In step 740, the presence server 132 returns the requested instant messaging contact information.

In decision diamond 744, the messaging system 104 reviews the response and determines whether the contacting communication device is instant messaging capable. If not, the TUI session between the messaging system and the contacting communication device in step 748 remains in an audio-only mode until session termination. If so, the messaging system 104 sends in step 752 to the contacting communication device an instant message containing HTML text with the URL to start the GUI session. The session remains in audio or TUI mode unless and until an appropriate HTTP request is made by the device.

In step 756, the contacting communication device, if capable, renders the HTML with the URL. If the user clicks on the URL, a browser session is launched by transmission of a HTTP request for the opening page addressed to the URL. If the contacting communication device is not capable of rendering the HTML and/or the user fails to click on the URL, the messaging system will time out and continue the session as an audio only session.

In step 760, if an HTTP request is received by the messaging system 104 from the contacting communication device, the messaging system 104 modifies the TUI session to become the audio channel for the GUI browser client and sends an appropriate HTTP response to the contacting communication device. In step 764, the contact proceeds as a GUI-driven audio session until session termination.

Returning again to decision diamond 724 when the second response is received by the messaging system, the contacting communication device in step 728 returns an OK message with an SDP payload for an audio session and data for the application capability.

When the messaging system 104 receives the OK message, the system 104 in step 772 sends a Real-Time Transport Protocol or RTP message to the contacting communication device containing the URL for the GUI session via the application data stream.

In step 776, the application-capable contacting communication device launches the browser and sends an HTTP request for the URL.

In step 780, the messaging system 104 detects the HTTP request and modifies the TUI audio session to become the audio channel for the GUI browser client. The system 104 sends an appropriate HTTP response to the contacting communication device.

In step 784, the contact proceeds as a GUI-driven audio session until termination.

Returning again to decision diamond 724 when the third response is received by the messaging system, the contacting communication device in step 732 returns an OK message with an SDP payload for audio and video sessions.

Upon receipt of the message, the messaging system 104 in step 788 prepares and sends video content to for the device to display to visually prompt the contacting party through TUI options and audio content.

In step 792, the contacting communication device receives the message, plays the audio, and simultaneously displays the video content to the contacting party. The contacting party views the displayed options and is not required to listen to all of the prompts. Until termination, the contact remains driven by key pad entries inputted by the contacting party or speech commands in response to audio and video prompts.

In the third, fourth, and fifth embodiments, messages are located and retrieved by searching the appropriate fields of the message store using the paired addresses of the contacting party and contacted party. It is to be understood that an address, particularly of the contacting party, can be considered to be a virtual address representing the set of addresses including PBX extension, phone number, E.164 international phone number, e-mail address, SIP handle, etc. by which the individual is known in a communications network. Hence, "contactor's address" or "address pair" of the contactor/contactee or sender/recipient should be read to mean any of the several forms of addresses associated with communications with the individual. This concept is especially important in a communications system intended for deployment in a converged network environment. This handles, for example, the case where one person may have sent another person an e-mail message, and the recipient places a phone call to the sender, and the recipient gets pre-call advice that the e-mail may be related to the call that the recipient is making. The associations between e-mail addresses and phone numbers specifically are known by multimedia messaging system such as INTUITY AUDIX™, but may also be available through means such as the ENUM services on the Internet. Some of the concepts related to the pairing of a named individual with multiple addresses are discussed in a copending patent application "Unified Communications Automated Personal Name Addressing", Ser. No. 09/619,276, filed in July 2000 to Brunson, which is incorporated herein by this reference.

A number of variations and modifications of the invention can be used. It would be possible to provide for some features of the invention without providing others.

For example in one alternative embodiment, the various components or modules can be implemented as hardware or software or a combination thereof and can be implemented in different ways. For example, the steps noted above for each module can be performed by other modules, depending on the application.

In another alternative embodiment, protocols other than those discussed above can be used with one or more of the above embodiments. For example, protocols that can be used in addition to or in lieu of SIP include the H.323 suite of protocols, HTTP, the Lightweight Directory Access Protocol, the Simple Object Access Protocol or SOAP, Integrated Services Digital Network or ISDN, and SQL and any other query/response protocol (such as a database protocol) in the various interactions with the presence server 132 and messaging system 104.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for handling a contact directed to a subscriber, comprising:
    conducting a messaging session with a communication device of a subscriber in which previously received messages are provided to the subscriber's communication device from a messaging system;
    during the messaging session between the messaging system and the subscriber's communication device, receiving a new contact intended for the subscriber's communication device;
    notifying the subscriber of the new contact;
    determining that the subscriber has accepted the new contact and in response thereto suspending the messaging session; and
    while the messaging session is suspended, connecting a contactor that originated the new contact with the subscriber by sending a call setup message to a communication device of the contactor, the call setup message comprising parameters which allow the contactor to join the subscriber in a new session, wherein the call setup message comprises an OK message including the messaging system's address, codec, and listening port number.

2. The method of claim 1, wherein the messages are one or more of text messages and voice messages and wherein, while the messaging session is suspended, a state of the messaging session is preserved and timeout disconnect treatment is disabled for the duration of the new contact.

3. The method of claim 1, wherein the conducting step comprises:
    assigning to the messaging session a temporary barge-in address for receiving incoming contacts during the messaging session.

4. The method of claim 3, wherein the conducting step comprises:
    registering the barge-in address with a presence server for at least the duration of the messaging session.

5. The method of claim 1, further comprising:
    during the messaging session between the messaging system and the subscriber's communication device, receiving a second new contact intended for the subscriber's communication device;
    notifying the subscriber of the second new contact;
    determining that the subscriber has not accepted the second new contact and in response thereto initiating a second new and different session with a second contactor associated with the second new contact to receive a message from the contactor.

6. The method of claim 1, further comprising:
when the contact is terminated, continuing the messaging session with the subscriber's communication device.

7. The method of claim 1, further comprising:
sending an INVITE message to the messaging system, the INVITE message containing a codec, address, and listening port number associated with the contactor, wherein the INVITE message causes the new contact to be announced to the subscriber.

8. The method of claim 3, wherein, when the messaging session is disconnected, the messaging system causes the barge-in address to become unregistered.

9. The method of claim 1, wherein, while the messaging system is waiting for an acceptance from the subscriber, the contactor receives a ring-back indicator.

* * * * *